(12) United States Patent
Kunert et al.

(10) Patent No.: US 8,144,456 B1
(45) Date of Patent: Mar. 27, 2012

(54) APPARATUS FOR MOBILE INFORMATION HANDLING

(75) Inventors: Steven R. Kunert, Cedar Rapids, IA (US); Kurt Olson, Dardanelle, AR (US); Matthew Miller, Cedar Rapids, IA (US)

(73) Assignee: MobileDemand, LC, Hiawatha, IA (US)

( * ) Notice: Subject to any disclaimer, the term of this patent is extended or adjusted under 35 U.S.C. 154(b) by 1197 days.

(21) Appl. No.: 11/975,137

(22) Filed: Oct. 16, 2007

Related U.S. Application Data

(60) Provisional application No. 60/852,087, filed on Oct. 16, 2006.

(51) Int. Cl.
*G06F 1/16* (2006.01)

(52) U.S. Cl. ............. 361/679.37; 345/642; 40/124.03; 455/557

(58) Field of Classification Search .............. 345/166, 345/538, 539, 427, 204, 173, 642, 649, 156, 345/419, 175; 361/679.01, 679.2, 679.6, 361/679.02, 679.31, 679.57, 801, 823, 679.37, 361/679.39, 679.41; 439/630; 710/15, 100, 710/105, 106, 305; 348/441, 445, 607; 455/558, 455/556, 41.2, 557; 40/124.03, 463, 124.01, 40/461, 661

See application file for complete search history.

(56) References Cited

U.S. PATENT DOCUMENTS

| | | | | |
|---|---|---|---|---|
| 6,940,731 | B2 * | 9/2005 | Davis et al. .................. | 361/801 |
| 7,066,766 | B2 * | 6/2006 | Harasawa et al. ............. | 439/630 |
| 2008/0001922 | A1 * | 1/2008 | Johnson et al. ............... | 345/166 |

* cited by examiner

*Primary Examiner* — Hung Duong
(74) *Attorney, Agent, or Firm* — Suiter Swantz pc llo

(57) ABSTRACT

A mobile information handling assembly comprising a mobile information handling device further comprising a plurality of peripheral device connection ports and a plurality of card slots, a data processing device electronically coupled to said mobile information handling device, a communications interface for providing communication between the mobile information handling device and the data processing device, and a carrying assembly, comprising a strap and at least two anchor assemblies further comprising an attachment device receiving assembly configured to receive an attachment device. The at least two anchor assemblies are configured to attach to the mobile information handling device at least two corners of the mobile information handling device.

19 Claims, 23 Drawing Sheets

APPARATUS FOR MOBILE INFORMATION HANDLING

CROSS REFERENCE TO RELATED APPLICATIONS

The present application claims priority under 35 U.S.C. §119(e) to U.S. Provisional Application Ser. No. 60/852,087 filed Oct. 16, 2006. U.S. Provisional Application Ser. No. 60/852,087 filed Oct. 16, 2006 is hereby incorporated by reference in its entirety.

FIELD OF THE INVENTION

The present invention relates to the field of electronic devices and particularly to a durable mobile information handling device.

BACKGROUND

Mobile computing is an important aspect of intrastate, interstate and international commerce. As technological advances are made in mobile communications technologies, it is often desirable to transport communication and computing devices to and from different locations. However, these portable communications and computing devices, that may be relatively expensive, may be subject to significant wear and tear due to their daily usage by delivery personnel.

Consequently, it would be advantageous if a system and apparatus existed that provided durable mobile computing.

SUMMARY OF THE INVENTION

Accordingly, the present invention is directed to a novel system and apparatus for mobile information handling.

According to a first embodiment of the present invention, a mobile information handling assembly comprises a carrying assembly, a carrying case, an integrated keypad assembly, a plurality of protective cover assemblies and at least one peripheral data processing device.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DESCRIPTION OF THE INVENTION

Figure 1:
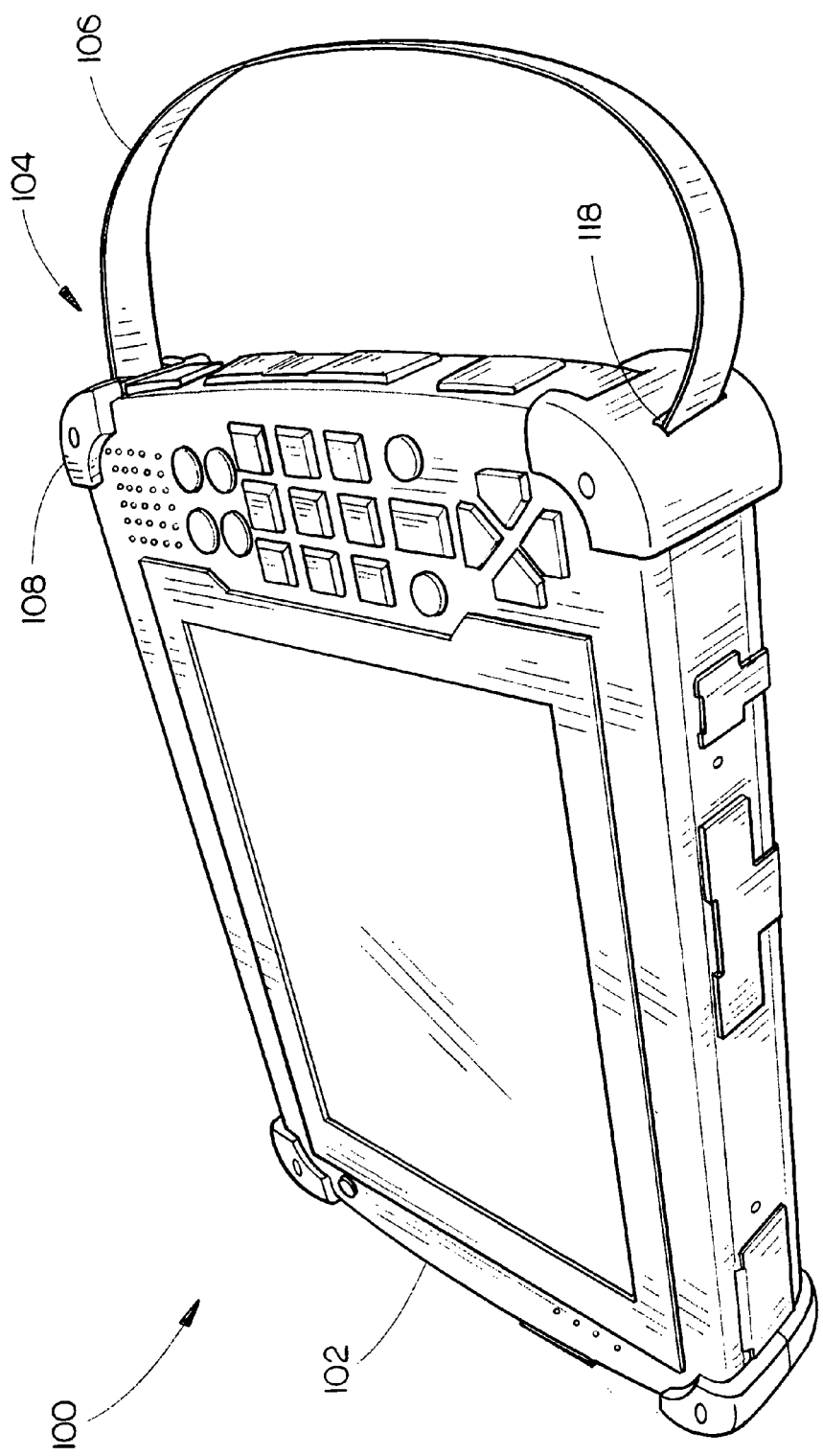
FIG. 1 is an illustration of a carrying assembly implemented with a mobile information handling device in accordance with exemplary embodiments of the present invention.
Figure 2:
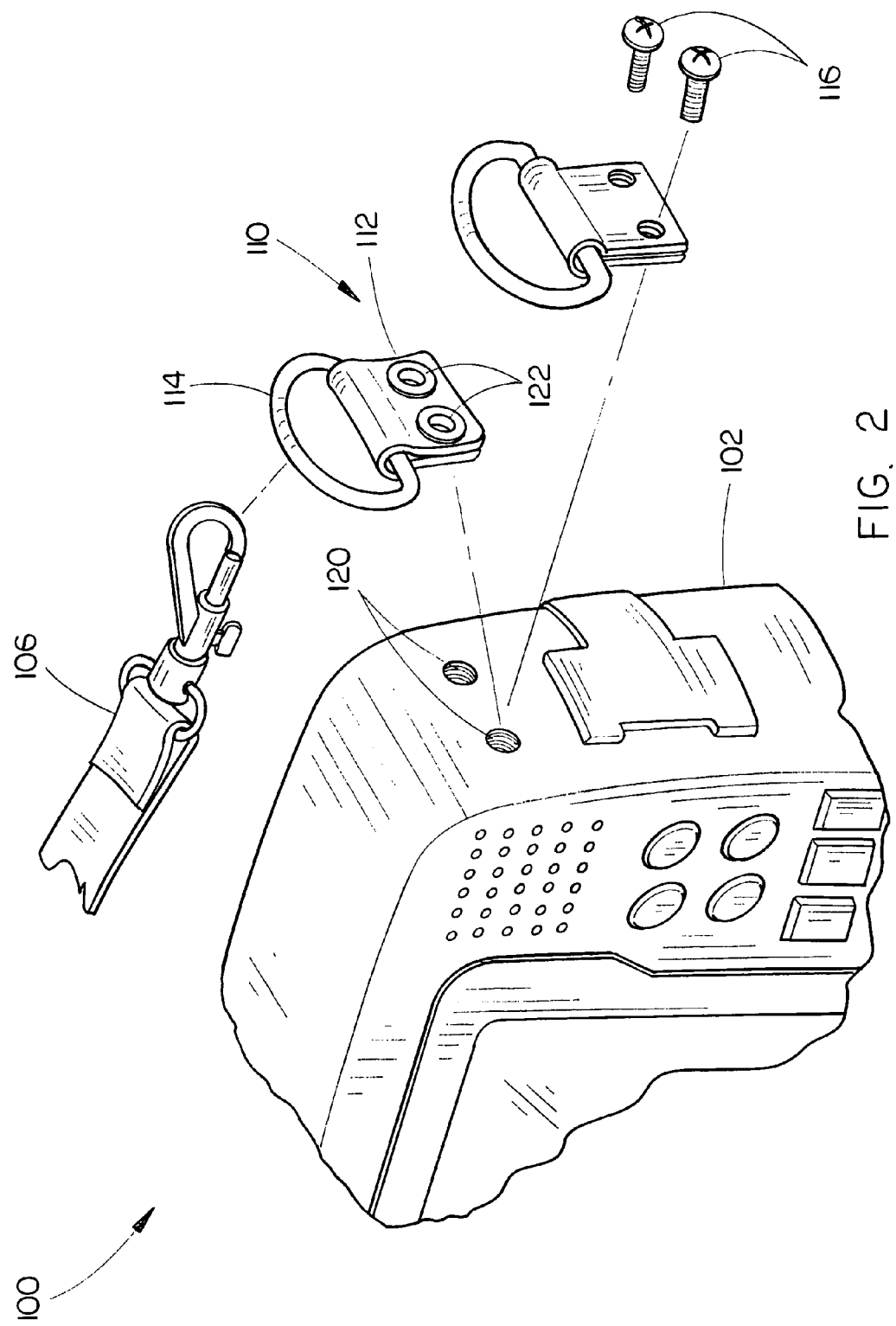
FIG. 2 is an exploded view of an additional embodiment of a carrying assembly implemented with a mobile information handling device in accordance with exemplary embodiments of the present invention.
Figure 3:
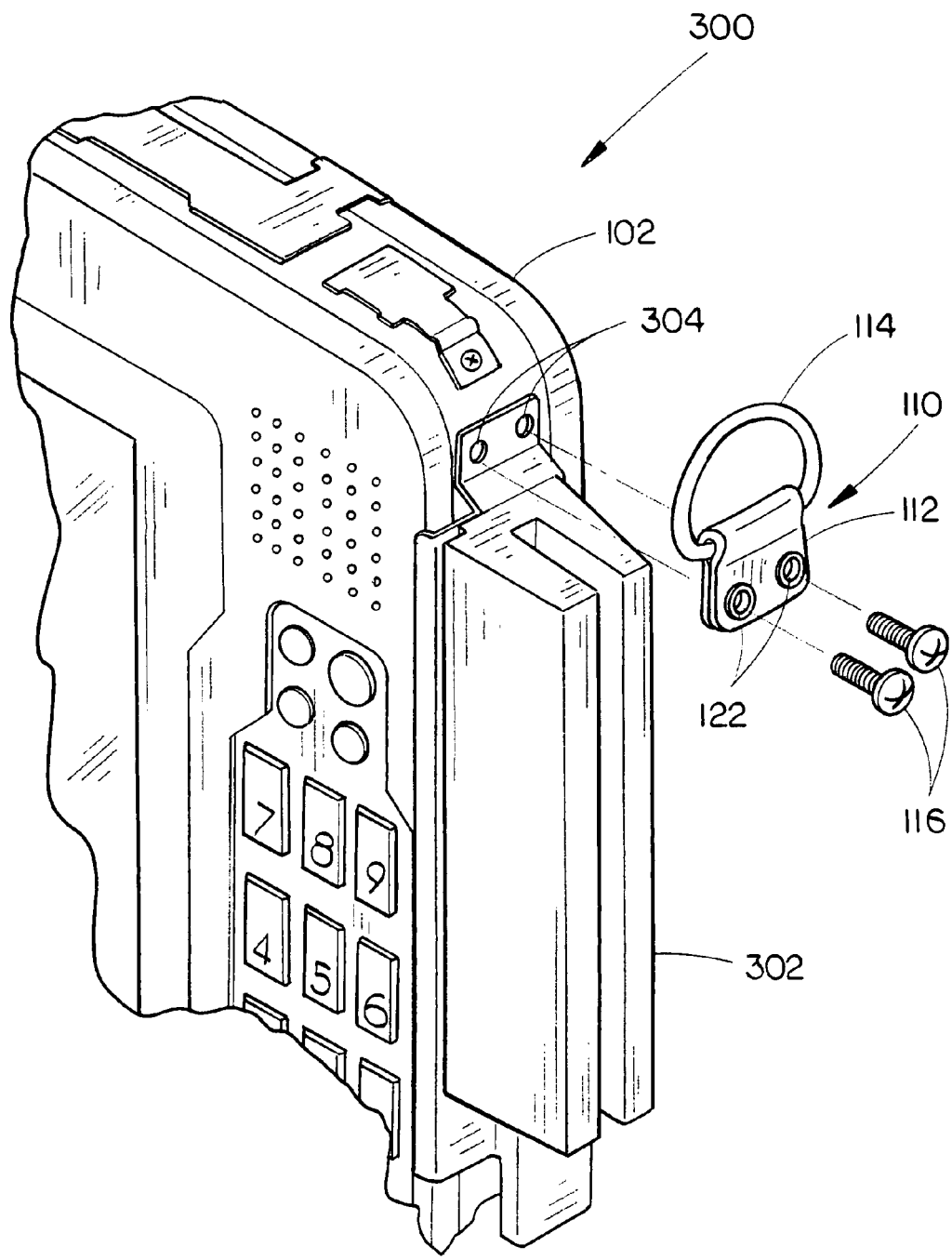
FIG. 3 is an illustration a data processing device implemented with a mobile information handling device and configured provide attachment of a carrying assembly in accordance with exemplary embodiments of the present invention.

Referring to FIGS. 1-3, illustrations of a mobile information handling assembly 100 are shown. FIG. 1 is an illustration 100 of a carrying assembly 104 implemented with a mobile information handling device 102 in accordance with exemplary embodiments of the present invention. FIG. 2 is an exploded view of an additional embodiment of a carrying assembly 104 implemented with a mobile information handling device 102 in accordance with exemplary embodiments of the present invention. FIG. 3 is an illustration a data processing device configured to attach to a mobile information handling device and provide attachment of a carrying assembly in accordance with exemplary embodiments of the present invention. Mobile information handling device may be comprised of a mobile information handling device 102, such as a tablet computer, laptop, PDA or a like mobile computing device. In an exemplary embodiment, mobile information handling device may be a tablet PC such as the T8600 computer, available from Mobile Demand, LLC. Mobile information handling assembly 100 may further comprise a carrying assembly 104 coupled to the mobile information handling device 102. The carrying assembly 104 may facilitate transport of the mobile information handling device 102, by providing one-handed or one-armed transportation of the device 102. The carrying assembly 104 may be particularly suited to persons who compute without the aid of a desk or a table, for example, while commuting or traveling, or for those who must compute on their feet, for example, by persons who inventory goods, like moving personnel who inventory the goods located on a premises in preparation for packing and shipping the goods, by persons conducting retail invoicing and pricing, and by census takers, building inspectors and insurance adjusters.

Carrying assembly 104 may comprise a carrying strap 106 such as a hand strap, shoulder strap or like strap. The carrying strap 106 may be composed of a flexible or malleable material such as leather, fabric, plastic, or any other suitable material. Carrying assembly 104 may further comprise an attachment assembly 108 coupled to at least two corners of the device 102. One end of the carrying strap 106 may be attached to a portion of the attachment assembly 108. Attachment assembly 108 may be disposed in at least two corners of the mobile information handling device 102 and may be formed of a pliable material. Attachment assembly may comprise at least one aperture 118 suitable for receiving a strap 106 of carrying assembly 104.

Referring to FIG. 2, an exploded view of an additional embodiment of a carrying assembly 104 configured to attach to a mobile information handling device 102 in accordance with exemplary embodiments of the present invention is shown. In this embodiment, the carrying assembly 104 may comprise an anchor assembly 110 disposed on at least two corners of the mobile information handling device 102. The anchor assembly 110 may be made of metal or a durable plastic, and may be constituted by a thin semi-circular metallic, plastic, or like durable material rod. The anchor assembly 110 may comprise an attachment device receiving assembly 112, such as strip folded substantially over to form a loop through which an attachment device 114 such as a D-ring may be inserted. The attachment device receiving assembly 112 may be sewn together below the attachment device 114 to assist in preventing undesired movement of the attachment device 114. The attachment device receiving assembly 112 may be coupled to the mobile information handling device 102 via at least one fastening device 116 such as a screw, bolt, nail or other such fastening device. The attachment device receiving assembly 112 may comprise one or more apertures 122 through which the fastening device 116 may be inserted. The mobile information handling device 102 may also comprise one or more apertures 120 into which the one or more fastening devices 116 may be inserted.

In an additional embodiment, anchor assemblies 110 may each be located substantially within an attachment assembly 108 coupled to a corner of a mobile information handling device 102. The attachment assembly 108 may comprise a housing molded to form extended rounded edge corners coupled to the corners of the mobile information handling device 102. Housing may house an anchor assembly 110 or other such anchoring device. Attachment assembly 108 may comprise an opening 118, such as rectangular aperture through which insertion of a carrying strap 104 may be suitable. Carrying strap 104 may be removably and adjustably secured to the mobile information handling device 102 via the anchor assembly 108.

Referring to FIG. 3, an illustration 300 of a data processing device 302 configured to attach to a mobile information handling assembly and provide attachment of a carrying assembly in accordance with exemplary embodiments of the present invention is shown. Data processing device 302 may be a magnetic card reader, scanner, imager or like data processing device. Data processing device 302 may comprise a plurality of apertures 304 suitable for receiving a fastening device 116 such as a screw, bolt, pin, nail or any fastening device configured to interact with an aperture disposed on the mobile information handling device 102.

Figure 4:
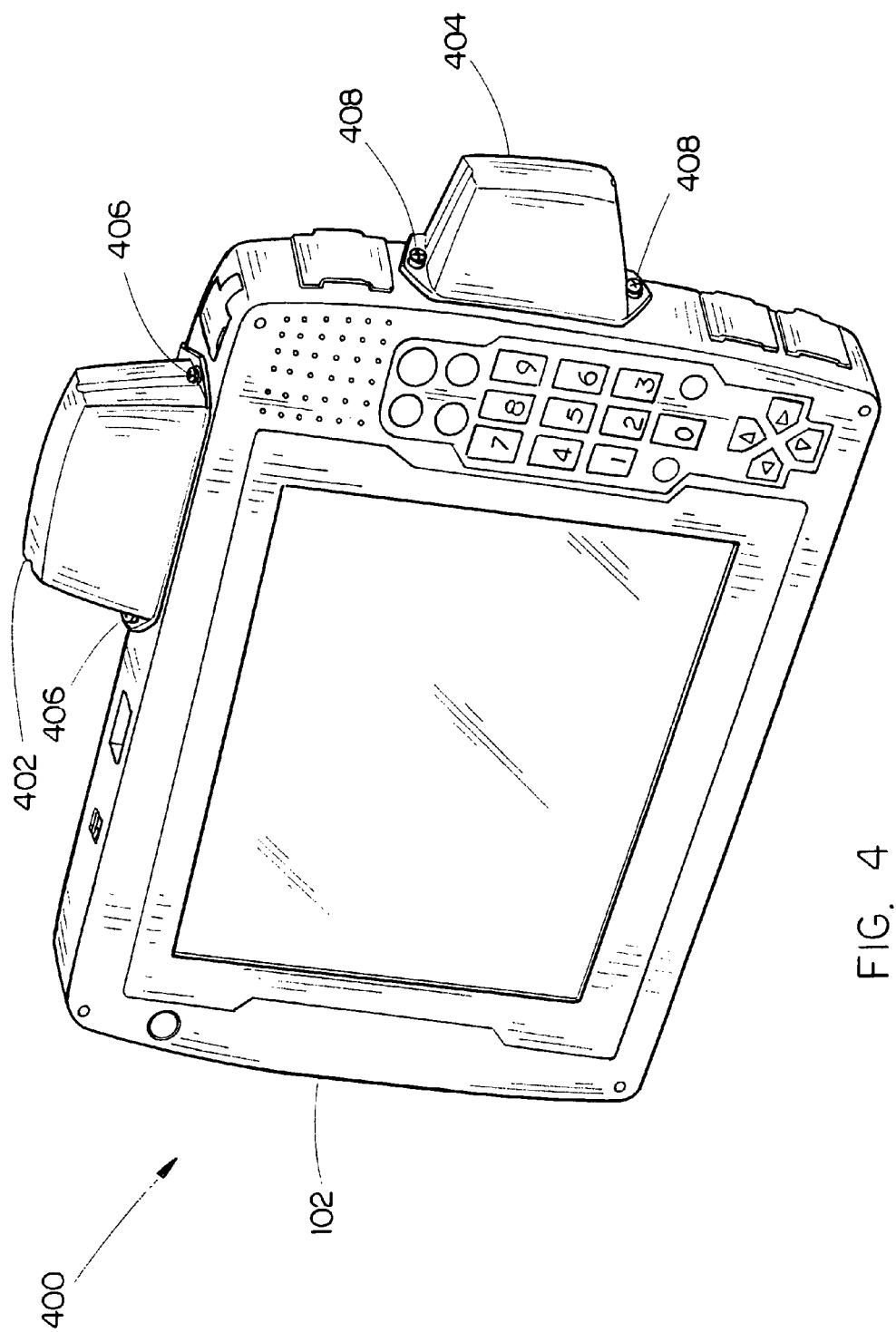
FIG. 4 is an illustration of a mobile information handling device implemented with a plurality of durable protective covers in accordance with exemplary embodiments of the present invention.
Figure 5:
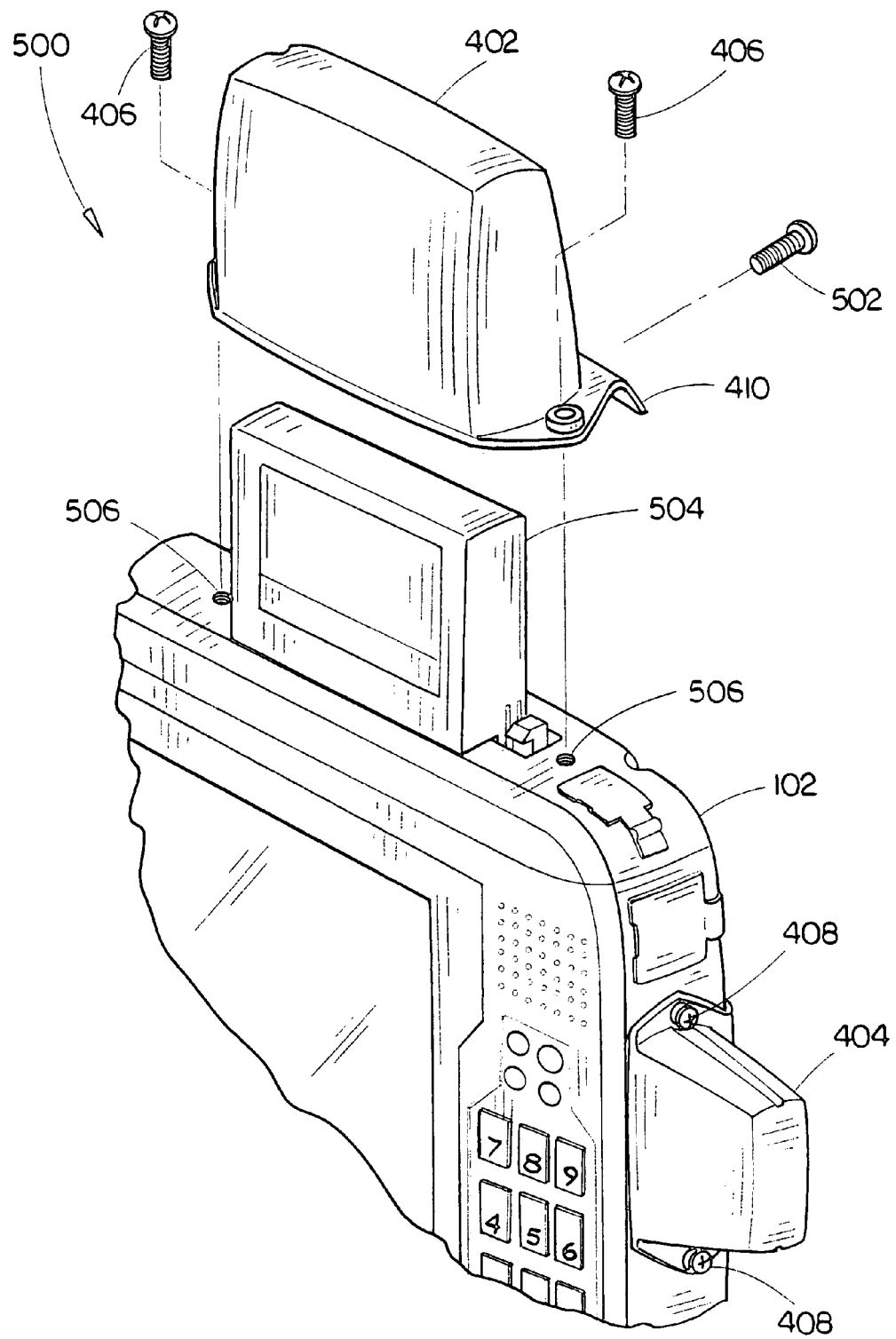
FIG. 5 is an exploded view of a plurality of durable protective covers configured to attach to a mobile information handling device in accordance with exemplary embodiments of the present invention.
Figure 7:
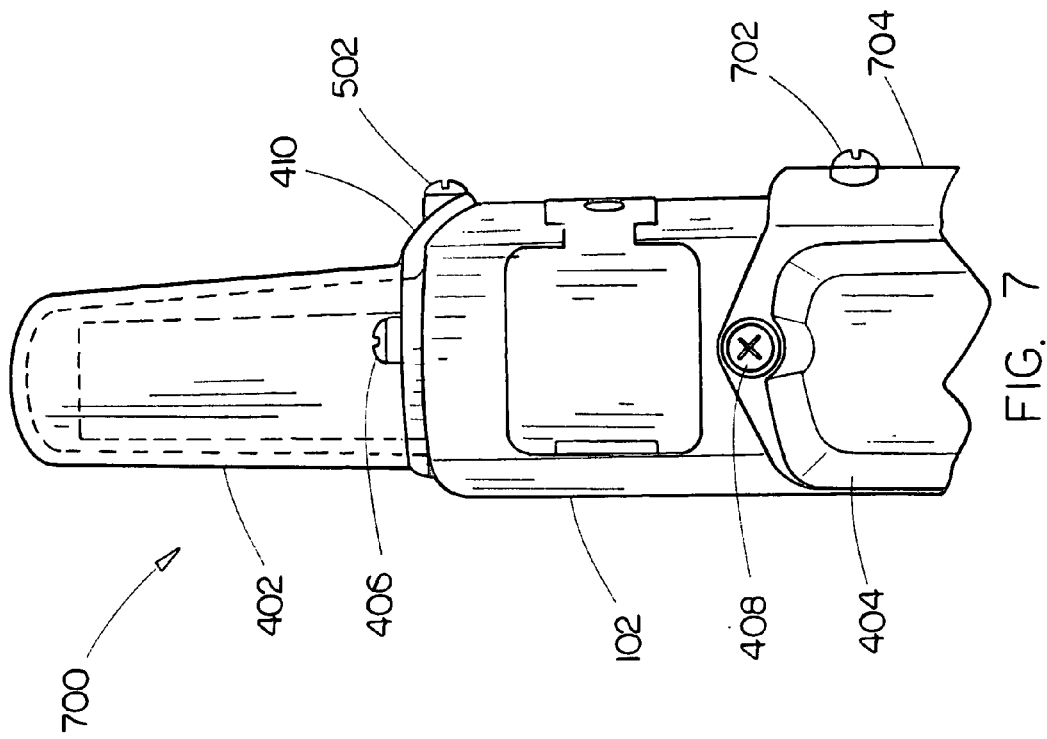
FIG. 7 is a side view of a plurality of durable protective covers configured to attach to a mobile information handling device in accordance with exemplary embodiments of the present invention.
Figure 6:
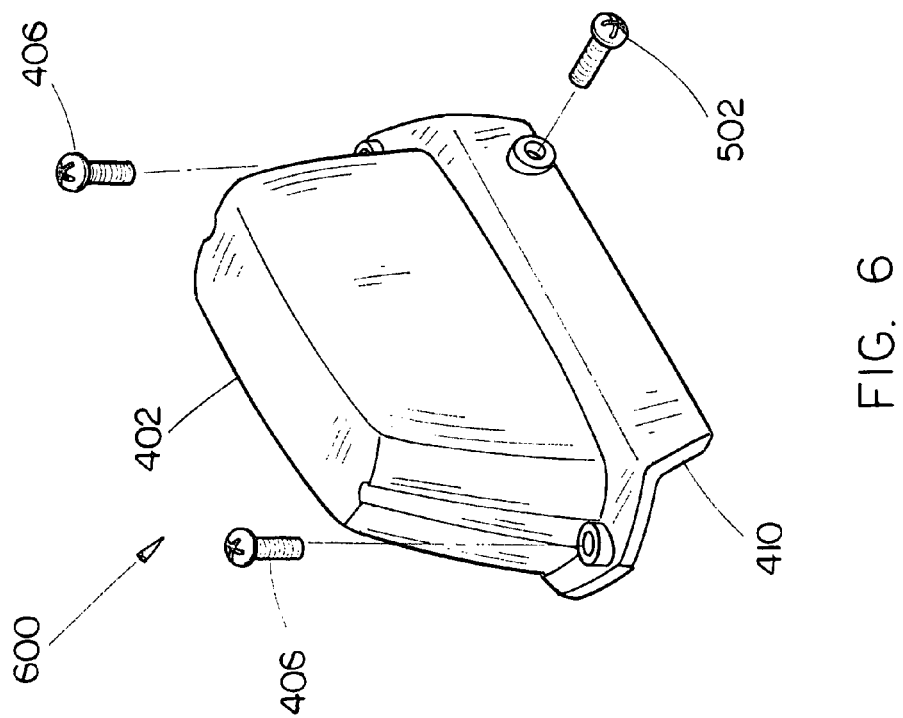
FIG. 6 is an illustration of a durable protective cover configured to attach to a mobile information handling device in accordance with exemplary embodiments of the present invention.

Referring to FIGS. 4-7, illustrations of a plurality of durable protective housings 402, 404 configured to attach to a mobile information handling device 102 in accordance with exemplary embodiments of the present invention are shown. FIG. 4 is an illustration 400 of a mobile information handling assembly comprising durable protective covers in accordance with exemplary embodiments of the present invention. FIG. 5 is an exploded view 500 of a plurality of durable protective covers 402, 404 configured to attach to a mobile information handling assembly 102 in accordance with exemplary embodiments of the present invention. FIG. 6 is an illustration 600 of a durable protective cover 402 configured to attach to a mobile information handling assembly 102 in accordance with exemplary embodiments of the present invention. FIG. 7 is a side view 700 of a plurality of durable protective covers 402, 404 configured to attach to a mobile information handling assembly 102 in accordance with exemplary embodiments of the present invention. Mobile information handling device 102 may be configured to receive a plurality of durable protective covers 402, 404 to configured to protect a plurality of peripheral storage, memory, processing or like slot devices 504. Each of the plurality of durable protective covers 402, 404 may be comprised of a durable material such as metal, metal alloy, plastic, or any like durable material. Device 504 may be a Personal Computer Memory Card International Association (PCMCIA or PC) card. A PC card may be any peripheral interface device configured for mobile computers. For instance, PC card may be a network card, a modem, a hard disk, a memory-expansion card or any other peripheral interface device suitable for insertion into a PC slot. Device 504 may also be a CompactFlash (CF) card. CF card may be a data storage device used in portable electronic devices. Plurality of protective covers 402, 404 may comprise a plurality of fastening devices 406, 408, 502 configured to securely attach the protective cover 402, 404 to the mobile information handling device 102. To this end, mobile information handling device 102 may comprise a plurality of apertures 506 configured to receive a fastening device 406, 408, 502, 702. Protective covers may also comprise an extended ledge region 410, 704 configured to rest against a side of the mobile information handling device 102 to provide additional stability.

Figure 8:
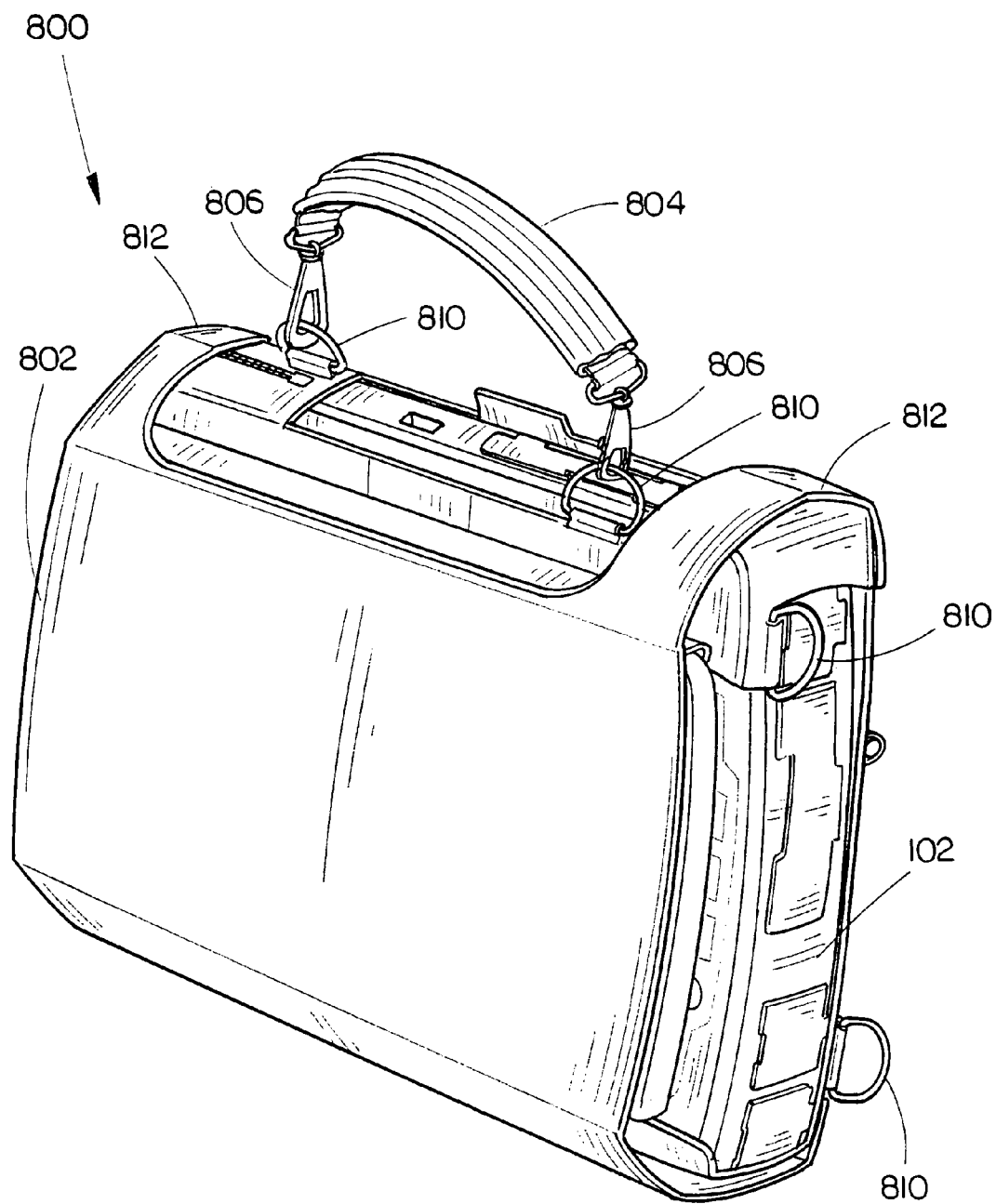
FIG. 8 is a front isometric view of a carrying case configured to receive a mobile information handling device in accordance with exemplary embodiments of the present invention.
Figure 9:
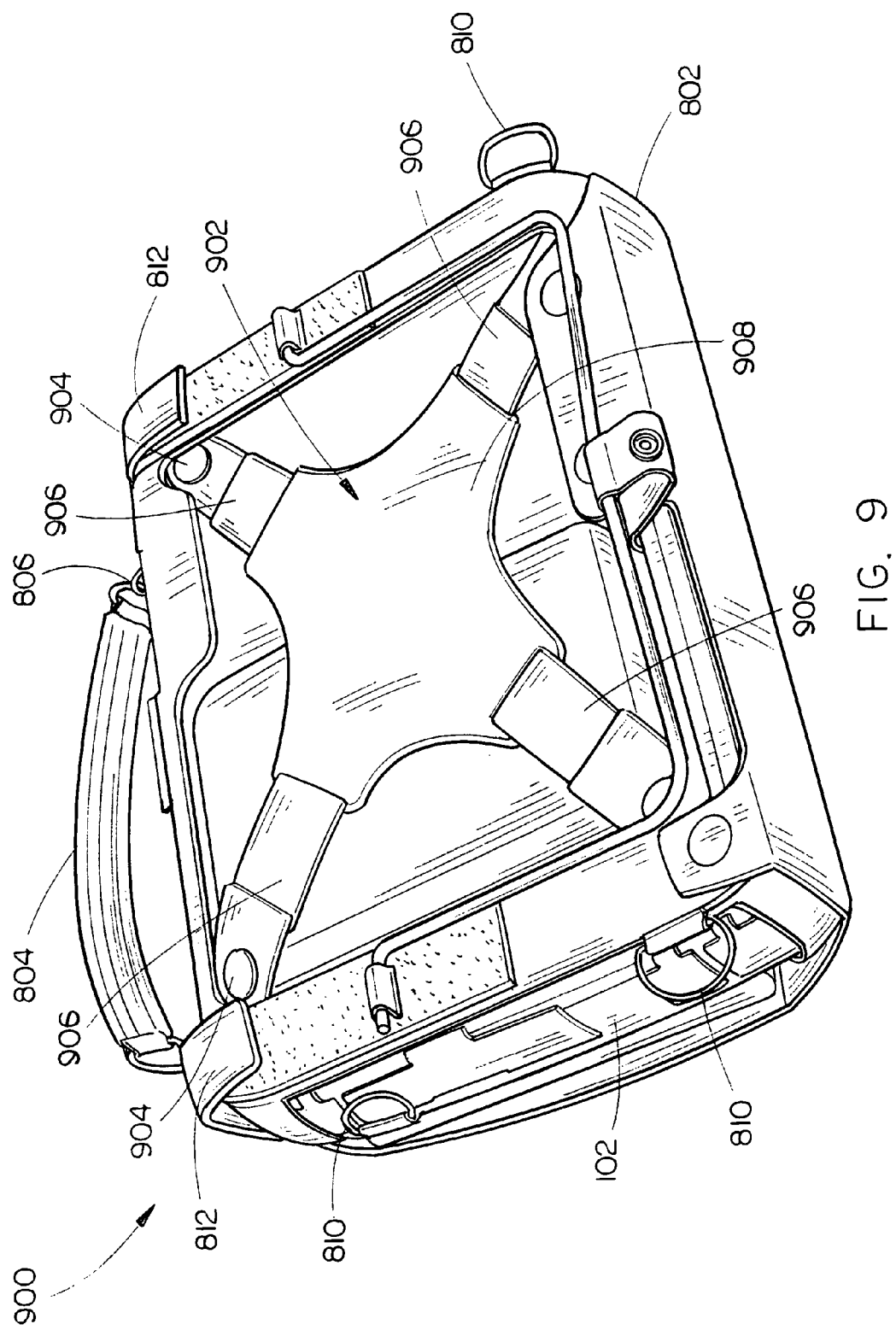
FIG. 9 is a back isometric view of a carrying case configured to receive a mobile information handling device in accordance with exemplary embodiments of the present invention.
Figure 10:
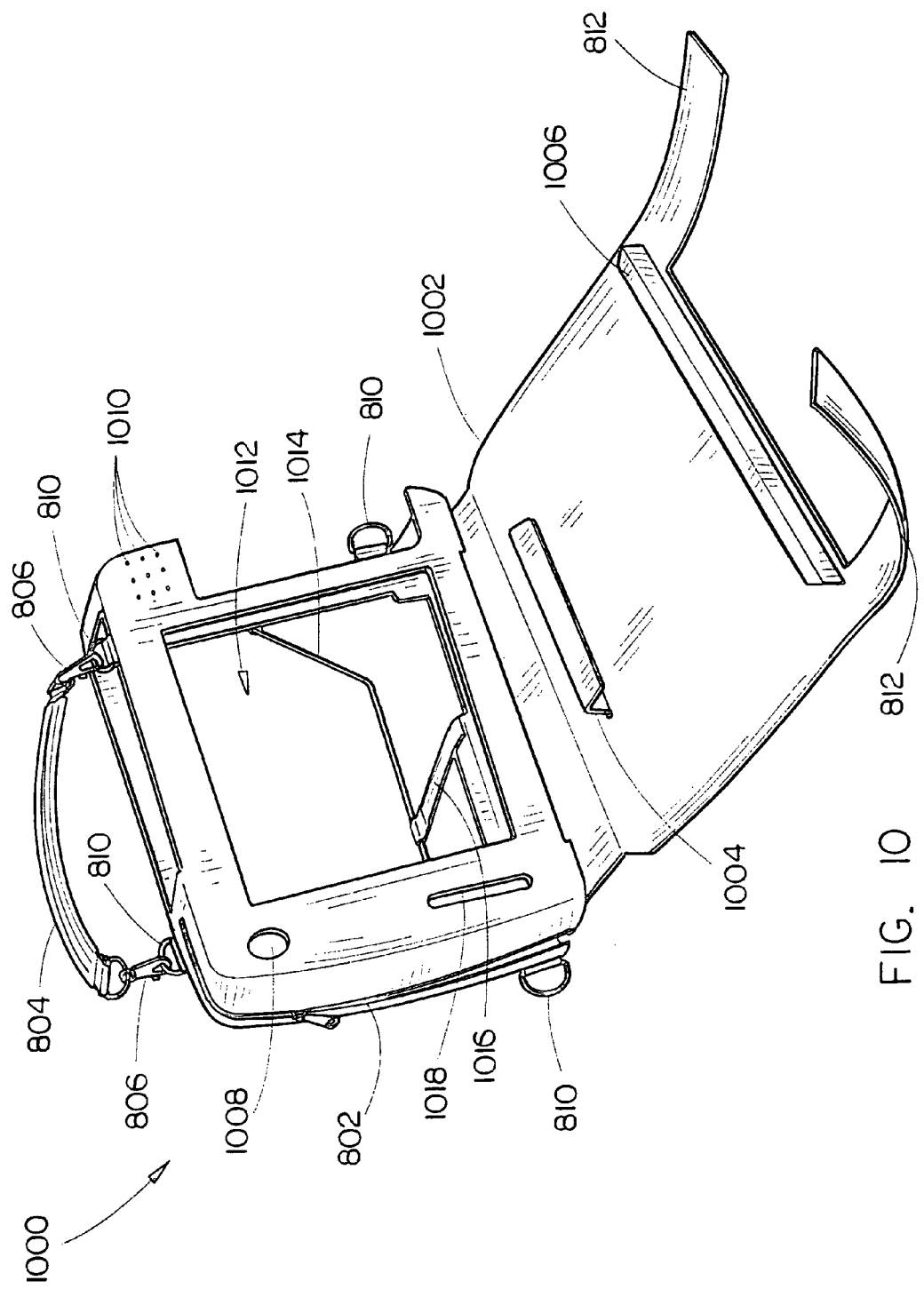
FIG. 10 is an isometric view of an open carrying case configured to receive a mobile information handling device in accordance with exemplary embodiments of the present invention.
Figure 11:
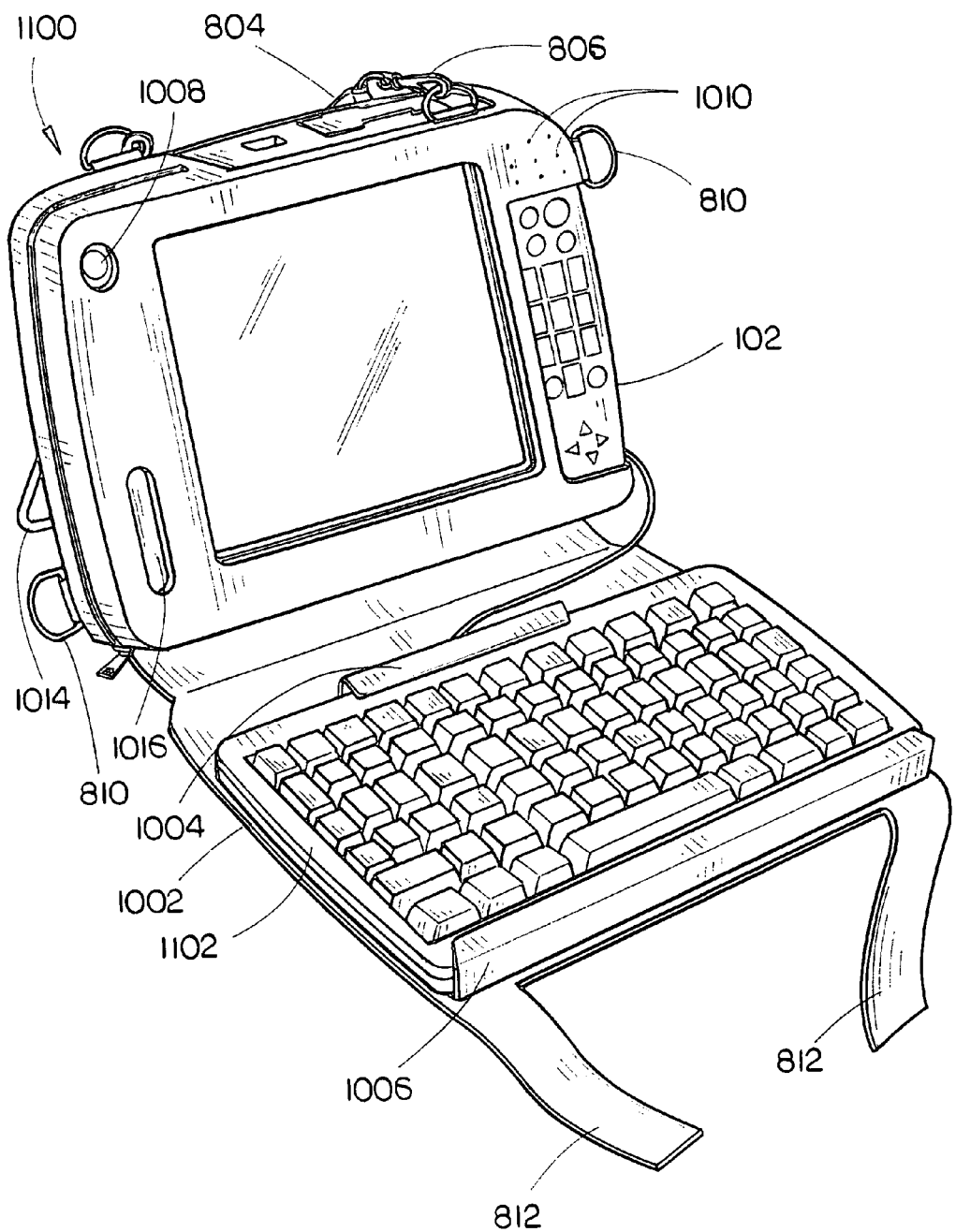
FIG. 11 is an isometric view of an open carrying case shown with a mobile information handling device and keyboard assembly in accordance with exemplary embodiments of the present invention.

Referring to FIGS. 8-11, illustrations of a carrying case 802 configured to receive a mobile information handling assembly 102 are shown. FIG. 8 is a front isometric view 800 of a carrying case configured to receive a mobile information handling assembly in accordance with exemplary embodiments of the present invention. FIG. 9 is a back isometric view 900 of a carrying case configured to receive a mobile information handling assembly in accordance with exemplary embodiments of the present invention. FIG. 10 is an isometric view 1000 of an open carrying case configured to receive a mobile information handling assembly in accordance with exemplary embodiments of the present invention illustrating the internal components of the carrying case. FIG. 11 is an isometric view 1100 of an open carrying case shown with a mobile information handling assembly and keyboard assembly in accordance with exemplary embodiments of the present invention. Carrying case 802 is configured to provide protection for the mobile information handling device 102 covering a substantial portion of the mobile information handling device 102. Carrying case 802 also comprises a handle assembly 804 further comprising a plurality of connecting assemblies 806 configured to releasably attach the handle assembly 804 to one or more connecting assembly receivers 810 disposed on the body of the carrying case 802. Carrying case 802 may also comprise a plurality of securing flaps 812 configured to secure the carrying case 802 around the mobile information handling assembly 102. For instance, securing flaps 812 may be comprised of hook and loop mating material configured to mate with hook and loop mating material disposed on the body of the carrying case 802. Securing flaps 812 may also comprise one or more snaps, button receiving slots, adhesive material, or any other securing device configured to mate with a securing device disposed on the body of the carrying case 802.

Referring specifically to FIGS. 10 and 11, carrying case 802 is shown in an open position. Carrying case 802 may unfold to provide removal of the mobile information handling device 102 or a stable upright position for a mobile information handling device 102. Carrying case 802 may comprise a keyboard securing assembly 1002 comprising an upper ledge 1004 and a lower ledge 1006 configured to secure a keyboard assembly 1102. Keyboard assembly 1102 may be inserted substantially within the area defined by the upper ledge 1004 and lower ledge 1006. Carrying case 802 may comprise a plurality of apertures 1008, 1010, 1012, 1018 configured to provide access to regions of the mobile information handling assembly 102 disposed within the carrying case 802. Carrying case 802 may also comprise a stand assembly 1014 configured to pull away from the body of the carrying assembly 802 to provide an upright positioning of the mobile information handling assembly 102. Stand assembly 1014 may comprise one or more stop assemblies 1016 configured to prevent the stand assembly 1014 from sliding away from the carrying case 802 beyond a point determined by the length of the stop assembly. Stop assembly 1016 may provide a stop for the stand assembly 1014 at a desired angle, and may be adjustable based on an application or a user preference.

Figure 12:
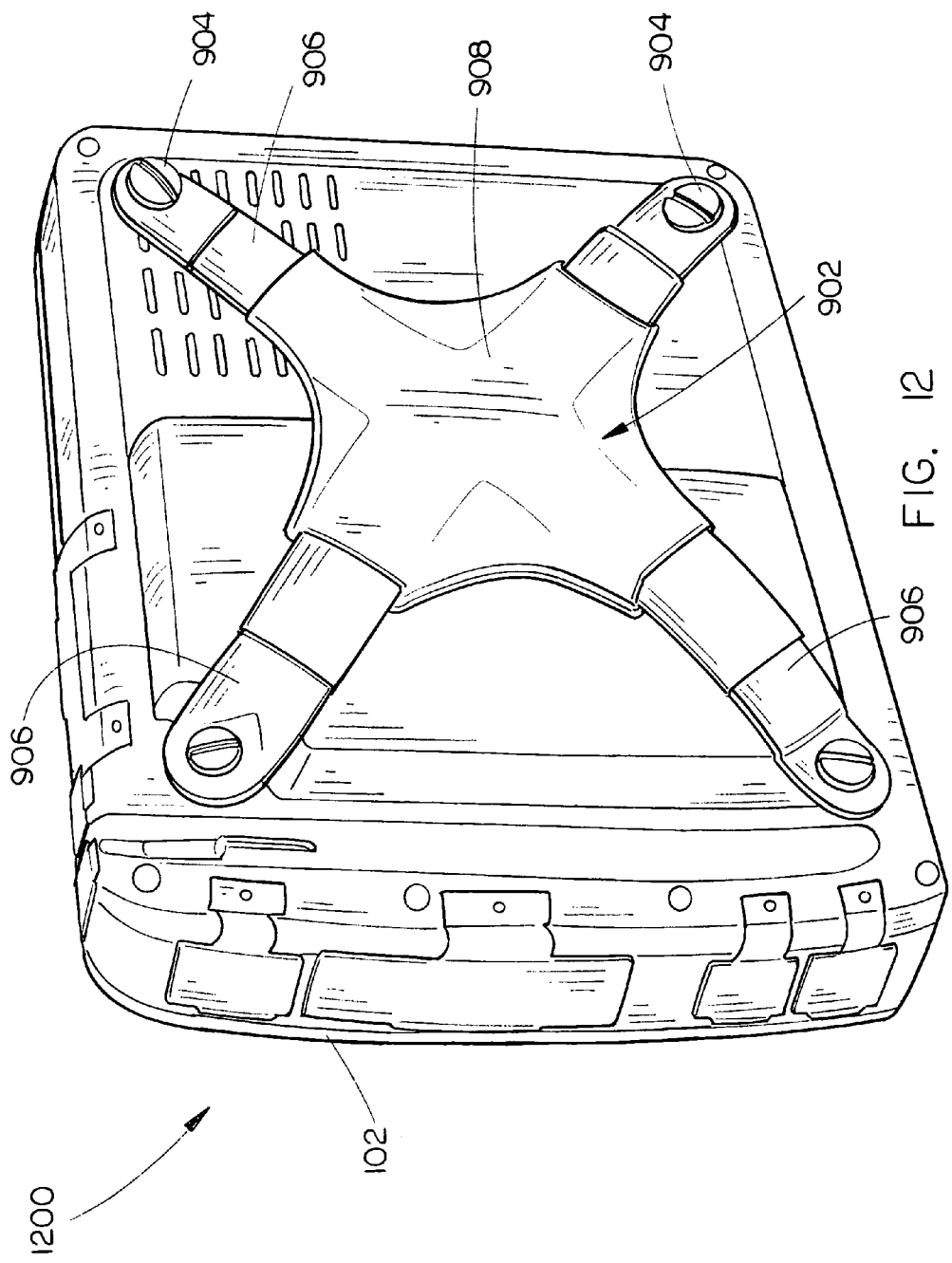
FIG. 12 is a back isometric view a mobile information handling device comprising a hand strap assembly in accordance with exemplary embodiments of the present invention.

Referring to FIGS. 9 and 12, back isometric views a mobile information handling assembly 100 comprising a hand strap assembly 902 in accordance with exemplary embodiments of the present invention is shown. Mobile information handling device 102 may be configured to receive a hand strap assembly 902 configured to provide one handed carrying of the mobile information handling device 102. Hand strap assembly 902 may be permanently or releasably secured to the mobile information handling device 102 via a plurality of securing devices 904 and may be substantially "X" shaped to provide a region through which a user may insert a hand. Hand strap assembly 902 may be comprised of a plurality of flexible outer regions 906, comprised, for example, of elastic or other such flexible material. Hand strap assembly 902 may also comprise a central portion 908 composed of a less flexible material configured to provide durable protection for a user.

Mobile information handling device 102 may also be configured to receive a double shoulder strap assembly (not shown). An individual strap of the double shoulder strap assembly may be worn over each shoulder to provide support for a mobile information handling device 102 utilizing both shoulders.

Figure 13:
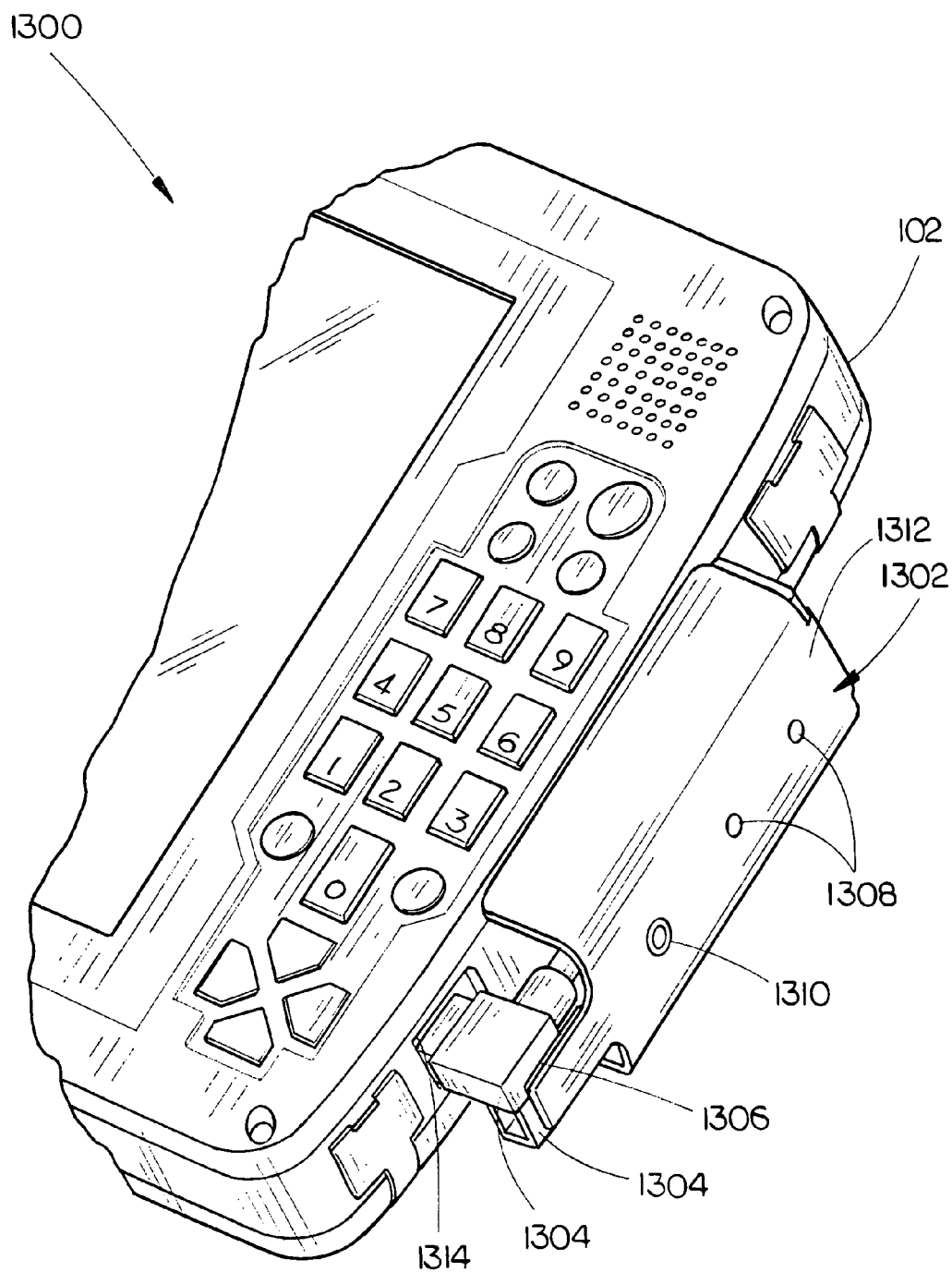
FIG. 13 is an isometric view of a USB port protective device attached to a mobile information handling device in accordance with exemplary embodiments of the present invention.
Figure 14A:
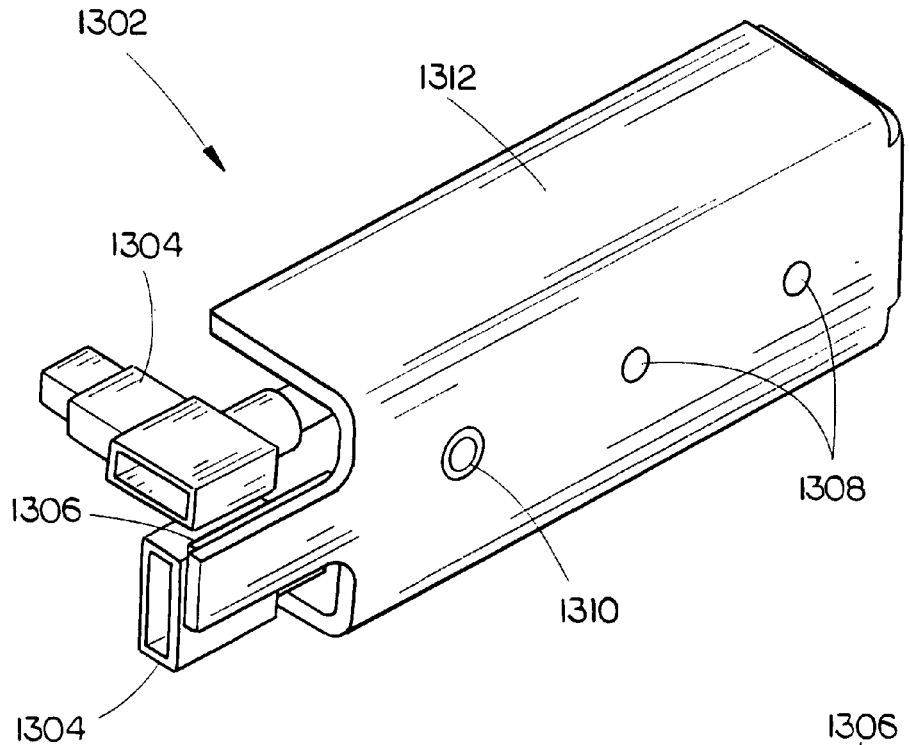
FIG. 14A is a front isometric view of a USB port protective device configured to attach to a mobile information handling device in accordance with exemplary embodiments of the present invention.
Figure 14B:
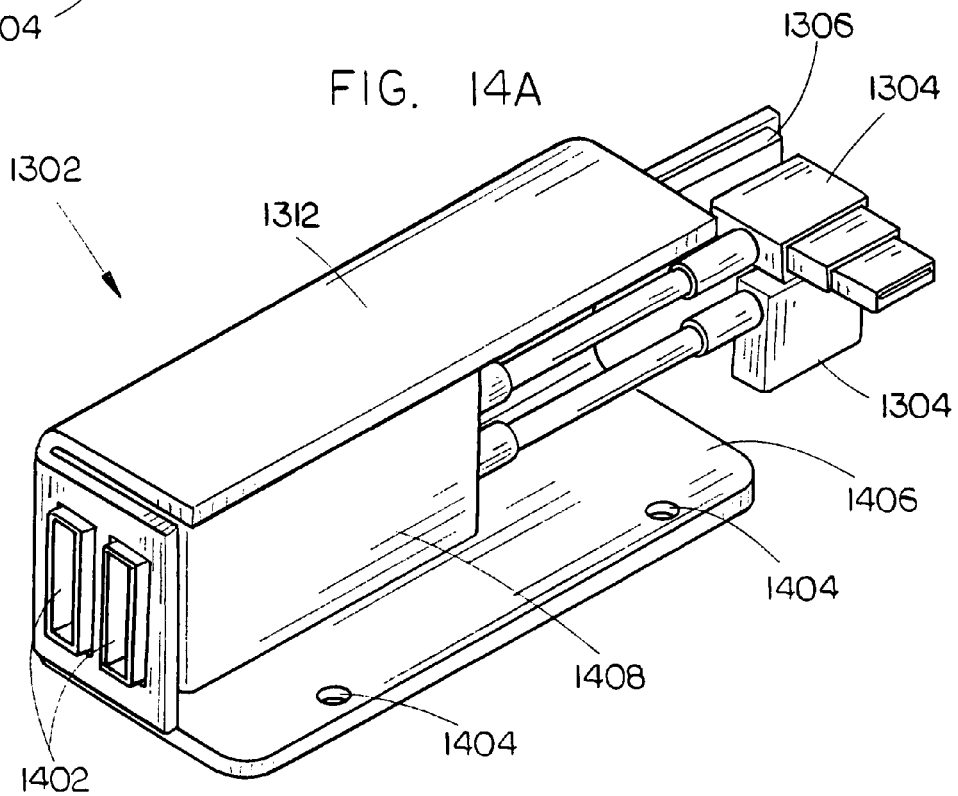
FIG. 14B is an additional illustration of a USB port protective device configured to attach to a mobile information handling device in accordance with exemplary embodiments of the present invention.

Referring to FIGS. 13-14B, illustrations of a universal serial bus (USB) port protective assembly 1302 configured to attach to a mobile information handling device 102 according to exemplary embodiments of the present invention are shown. FIG. 13 is an isometric view 1300 of a USB port protective assembly attached to a mobile information handling assembly in accordance with exemplary embodiments of the present invention. FIG. 14A is a front isometric view of a USB port protective assembly 1302 configured to attach to a mobile information handling assembly in accordance with exemplary embodiments of the present invention. FIG. 14B is an additional illustration of a USB port protective assembly 1302 configured to attach to a mobile information handling assembly in accordance with exemplary embodiments of the present invention. Mobile information handling device 102 may be configured to receive a USB port protective assembly 1302. USB port protective assembly 1302 may be comprised of a durable material such as metal, metal alloy, plastic, or any like durable material. USB port protective assembly may comprise a housing 1312, at least one USB connective device 1304 and at least one USB port 1402. USB connective device 1304 may be inserted into a USB port 1314 of a mobile information handling device 102. USB port 1402 of the USB port protective assembly 1302 may be configured to receive a USB connective device of any peripheral device having a USB connective device. In this manner, USB port protective assembly 1302 provides protection of existing USB ports 1314 of a mobile information handling device 102 and durable USB port availability. USB port protective assembly 1302 may comprise a plurality of apertures 1308, 1310, 1404 configured to align with one or more apertures on a mobile information handling device 102 through which a securing device may be inserted. USB port protective assembly 1302 may comprise a ledge 1406 configured to rest against a side of the mobile information handling device 102. USB port protective assembly 1302 may comprise a padded region 1306 configured to provide cushioning for the one or more USB connective devices 1304. USB port protective assembly 1302 may also comprise a component housing 1408 suitable for housing electrical components connecting the USB connective device 1304 and USB port 1402 of the USB port protective assembly 1302.

Figure 15:
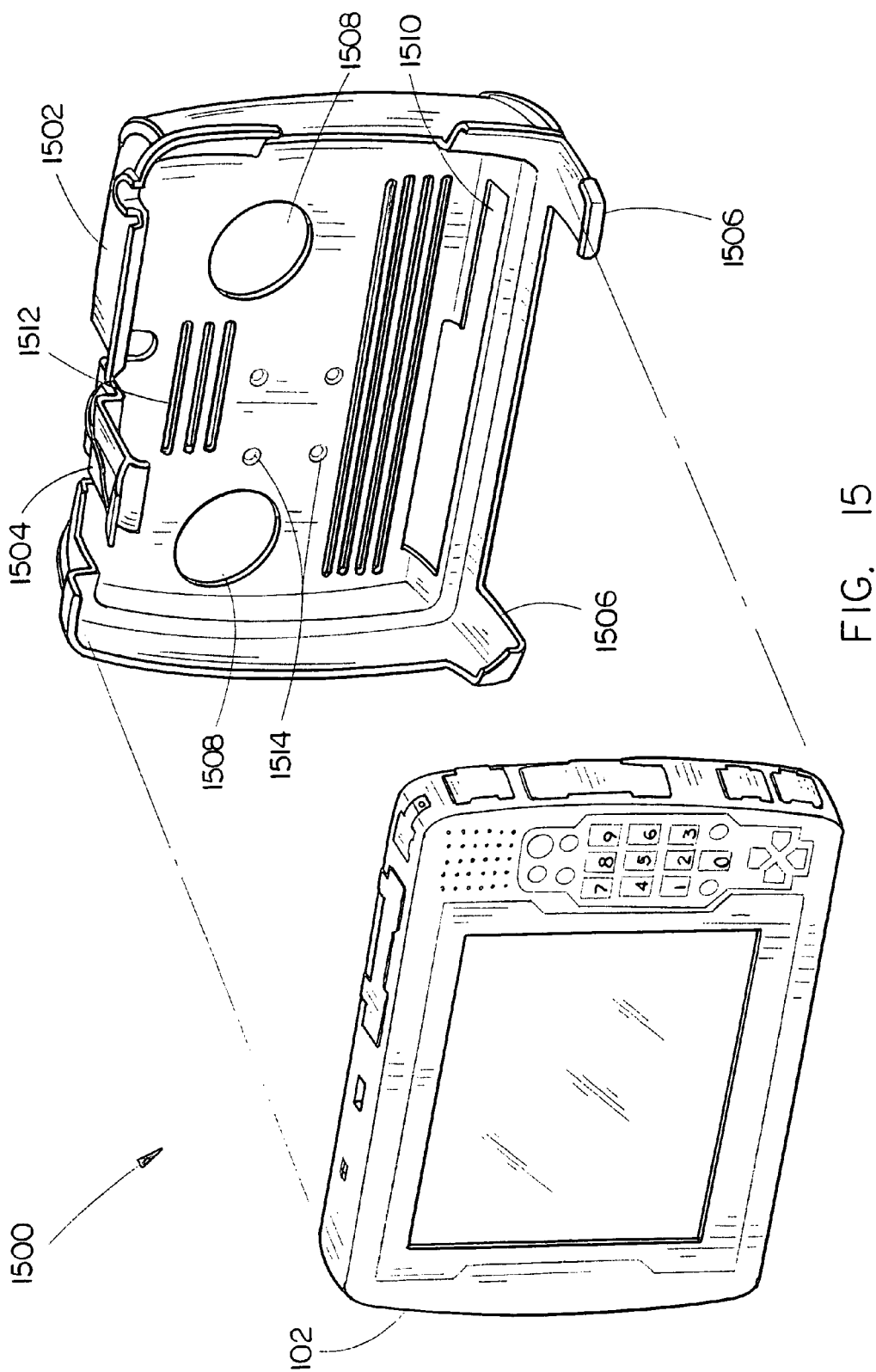
FIG. 15 is an illustration of a molded mounting assembly configured to receive a mobile information handling device in accordance with exemplary embodiments of the present invention.
Figure 16:
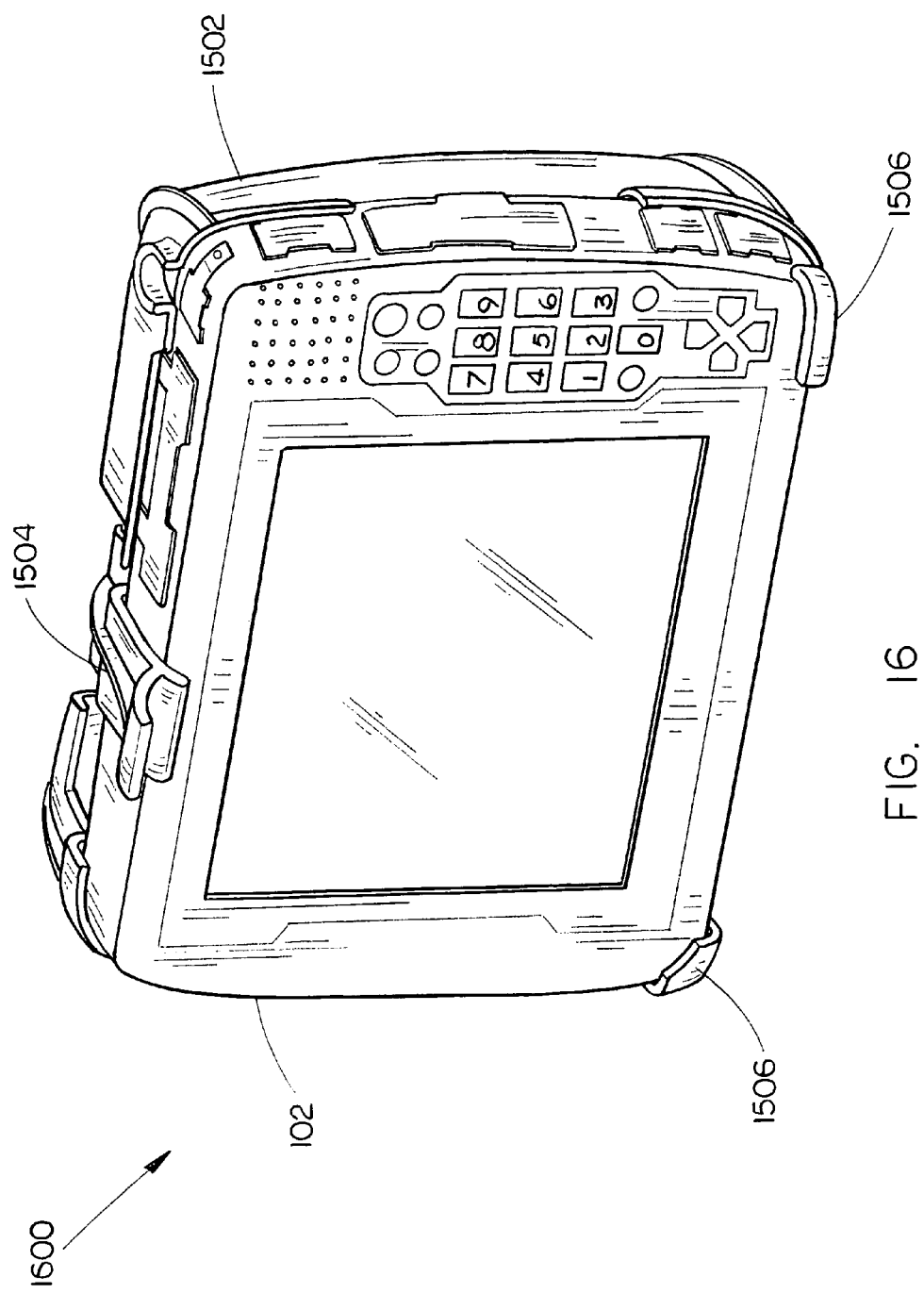
FIG. 16 is an additional illustration of a molded mounting assembly configured to receive a mobile information handling device in accordance with exemplary embodiments of the present invention.

Referring to FIGS. 15-16, illustrations of a mobile information handling device 102 implemented with a molded mounting assembly 1502 are shown. FIG. 15 is an illustration 1500 of a molded mounting assembly 1502 configured to receive a mobile information handling device 102 in accordance with exemplary embodiments of the present invention. FIG. 16 is an additional illustration 1600 of a molded mounting assembly 1502 configured to receive a mobile information handling device 102 in accordance with exemplary embodiments of the present invention. Molded mounting assembly 1502 may be comprised of a semi-flexible material such as any type of plastic, thin metal or metal alloy, silicon or like material configured to provide flexible or semi-flexible mounting of the mobile information handling device 102. Molded mounting assembly 1502 may comprise a latch assembly 1504 configured to provide secure housing of the mobile information handling device 102 within the molded mounted assembly 1502. Molded mounting assembly 1502 may also comprise one or more support ledges 1506, and a plurality of apertures, such as one or more cooling apertures 1508, connective port access apertures 1510, or like access apertures 1512, 1514 configured to provide access to desired regions of the mobile information handling device 102.

Figure 17:
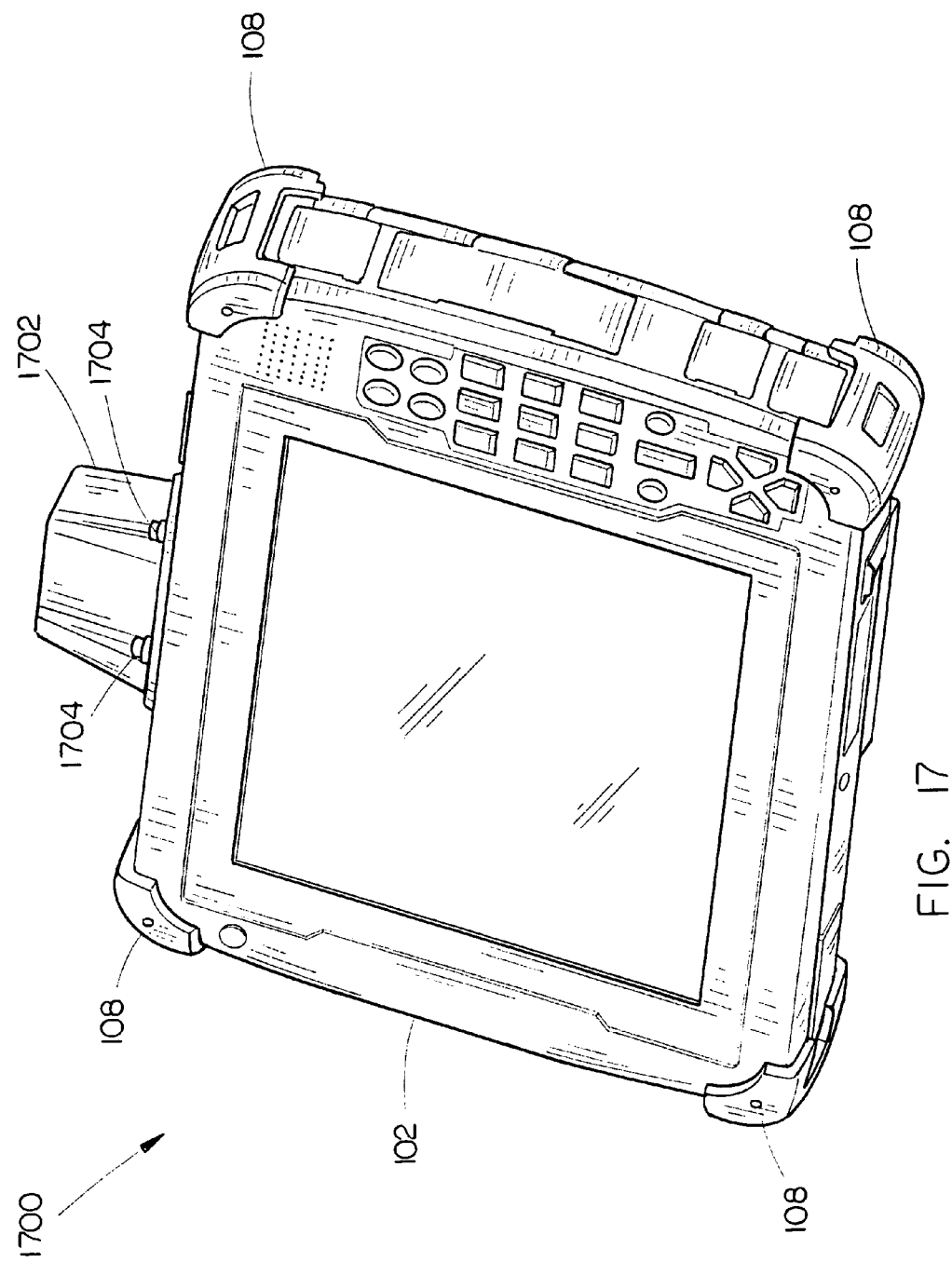
FIG. 17 is a front isometric view of a mobile information handling device implemented with a data processing device in accordance with exemplary embodiments of the present invention.
Figure 18:
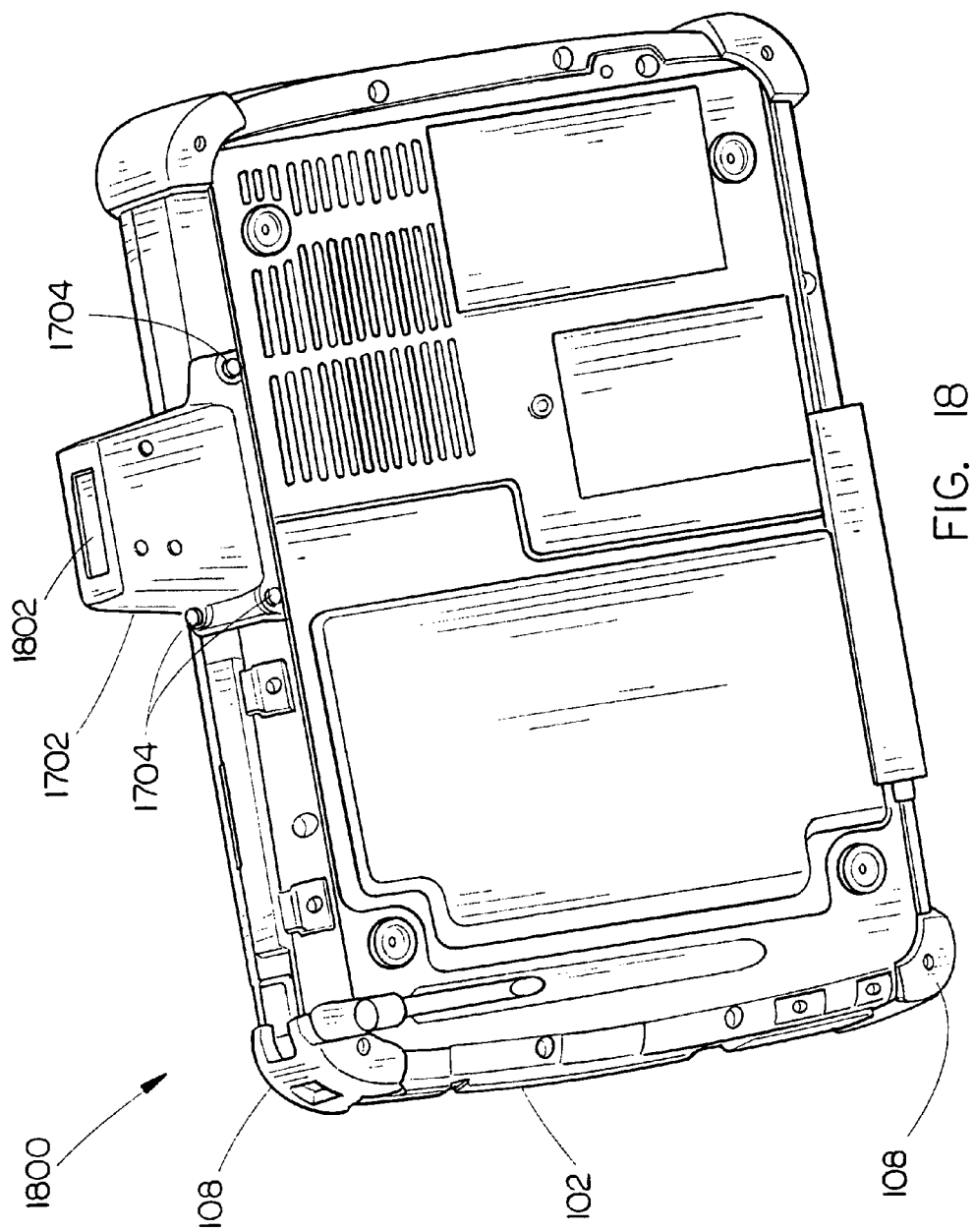
FIG. 18 is a back isometric view of a mobile information handling device implemented with a data processing device in accordance with exemplary embodiments of the present invention.
Figure 19A:
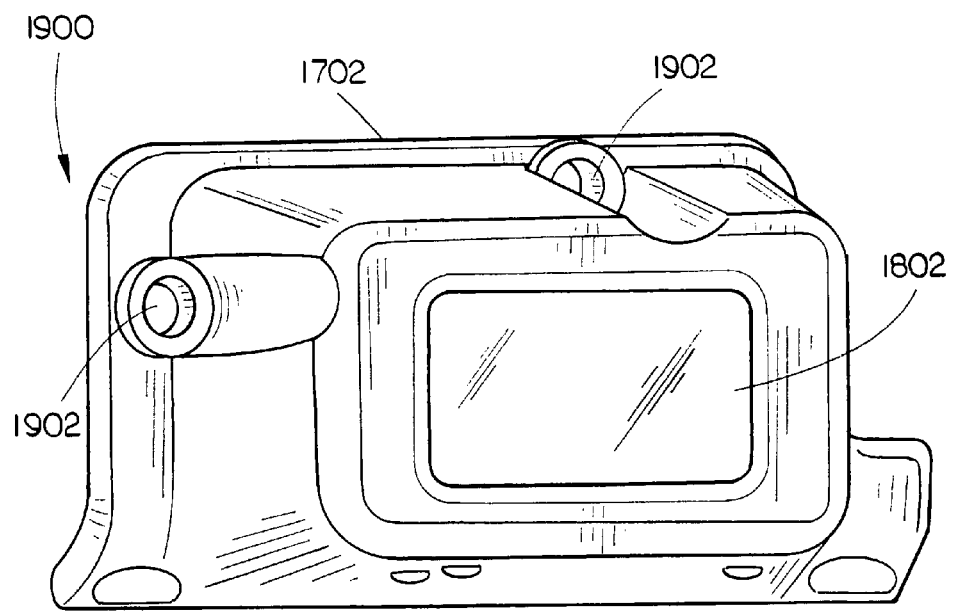
FIG. 19A is a front illustration of a data processing device in accordance with exemplary embodiments of the present invention.
Figure 19B:
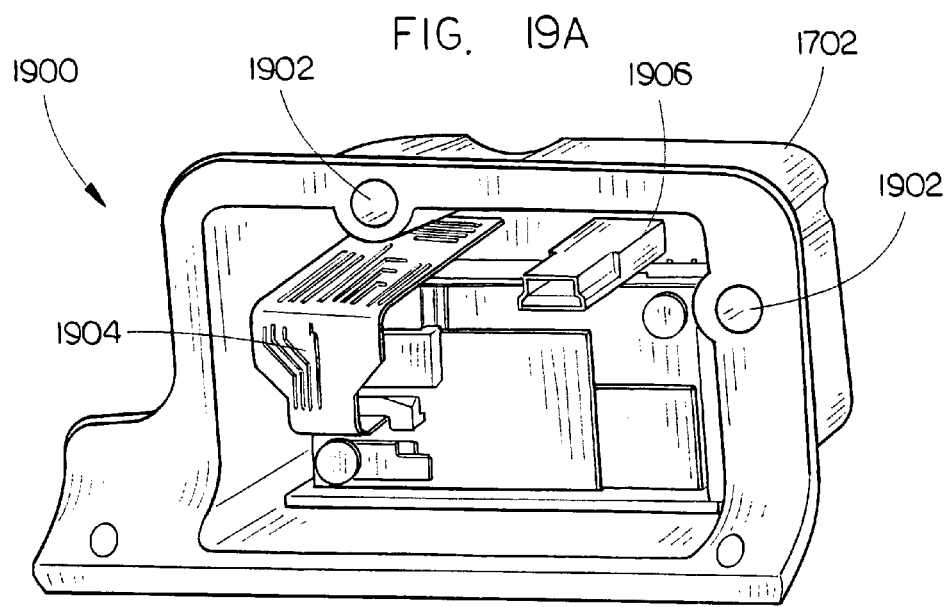
FIG. 19B is a back illustration of a data processing device in accordance with exemplary embodiments of the present invention.
Figure 20:
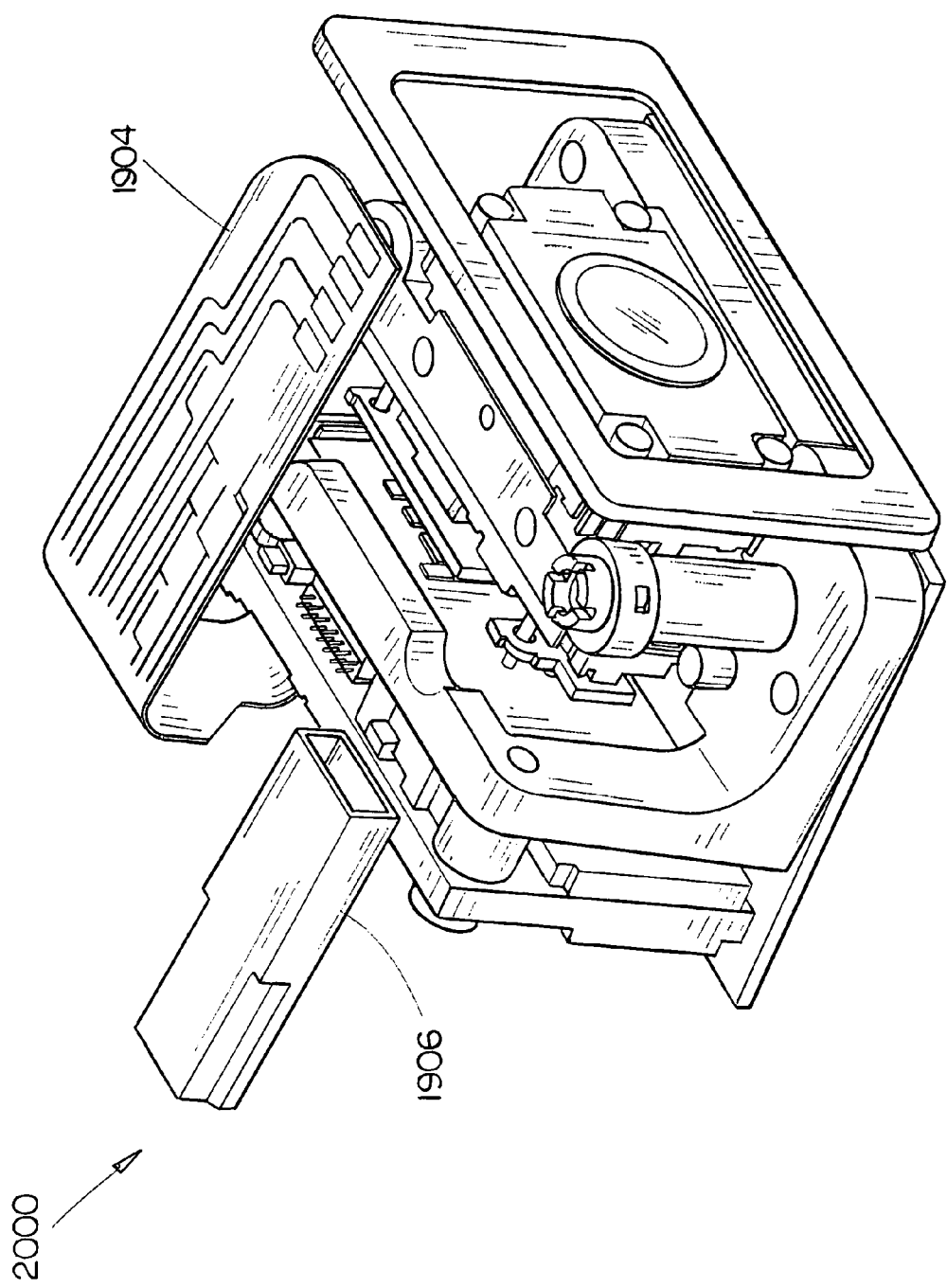
FIG. 20 is an illustration of the internal components of a data processing device configured to attach to a mobile information handling device in accordance with exemplary embodiments of the present invention.

Referring to FIGS. 17-20, illustrations of a data processing device 1702 are shown. FIG. 17 is a front isometric view of a mobile information handling device 102 implemented with a data processing device 1702 in accordance with exemplary embodiments of the present invention. FIG. 18 is a back isometric view of a mobile information handling device 102 implemented with a data processing device 1702 in accordance with exemplary embodiments of the present invention. FIG. 19A is a front illustration of a data processing device 1702 in accordance with exemplary embodiments of the present invention. 19B is a back illustration of a data processing device 1702 in accordance with exemplary embodiments of the present invention. FIG. 20 is an illustration of the internal components of a data processing device 1702 configured to attach to a mobile information handling assembly in accordance with exemplary embodiments of the present invention. Data processing device 1702 may be a scanner, magnetic card reader, or other such processing device for scanning graphic indicia and transforming the graphic indicia into electrical signals suitable for processing. Data processing device 1702 may comprise an image detecting region 1802 and a plurality of apertures 1902 configured to align with one or more apertures on the mobile information handling device 102 and through which at least one securing device 1704 may be inserted.

Referring specifically to FIGS. 19B and 20, illustrations of exemplary internal components of a data processing device 1702 are shown. Data processing device 1702 may comprise components 1904, 1906 suitable for electro-optically transforming the graphic indicia into electrical signals and decoding the signals into alphanumerical characters that are intended to be descriptive of the article or some characteristic thereof. Such characters are typically represented in digital form and utilized as an input to a data processing system for applications in point-of-sale processing, inventory control, and the like.

Data processing device 1702 may also comprise a sensor or photo-detector suitable for detecting light reflected or scattered from the graphic indicia. The photo-detector or sensor may be positioned in the scanner in an optical path so that it has a field of view which extends across the slight past the graphic indicia. A portion of the light which is reflected or scattered off the graphic indicia may be detected and converted into an electrical signal. Electronic circuitry or software decodes the electrical signal into a digital representation of the data represented by the graphic indicia that has been scanned. For example, the analog electrical signal operated by the photo-detector may be converted into a pulse width modulated digital signal, with the widths corresponding to the physical widths of the bars and spaces. Such a digitized signal may then be decoded based upon the specific symbology used by the graphic indicia into a binary representation of the data encoded in the graphic indicia, and subsequently to the alphanumeric characters so represented.

In one embodiment of the present invention, data processing device 1702 may comprise a light beam directed by a lens or similar optical components along a light path toward a target that includes some graphic indicia such as a barcode on a surface. The data processing device may operate by repetitively scanning the light beam in a line or series of lines across the graphic indicia by means of motion of a scanning component, such as a mirror, disposed in the path of the light beam. The scanning component may either sweep the beam spot across the graphic indicia and trace a scan line across and past the graphic indicia, or scan the field of view of the scanner, or both.

Upon scanning the graphic indicia, a decoder may receive the pulse width modulated digital signal from data processing device 1702, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user. Otherwise, the decoder may receive the next scan, performs another decode attempt on that scan, and so on, until a completely decoded scan is achieved or no more scans are available.

Mobile information handling assembly 100 may comprise software configured to map hardware keys to one or more data processing devices 1702 electrically connected to the mobile information handling device 102. Peripheral devices suitable to be configured for use with mobile information handling software may include a scanning device, a barcode reader slot suitable for receiving barcode information via a card, an imager, a camera suitable for capturing 2 dimensional or 3 dimensional images, a projector and the like. Mobile information handling assembly 100 may further comprise port suitable for receiving an LED/MEMS based projector for projecting an image. Software may be capable of determining which device is connected to the mobile information handling device 102. In an additional embodiment, software may be configured to execute a dialog box on a user interface of the mobile information handling device 102. Dialog box may comprise a peripheral device scanned media query. For instance dialog box may display an query as to whether the scanned media is an image or a barcode. Software may further comprise an event recognition engine suitable for acquiring data from a registry or from an event notification. Software event recognition engine may be capable of determining a data gathering instance.

Hardware keys may be mapped into programs, such as scanning, through use of a driver. In one embodiment, a basic input/output system (BIOS) provider comprises a hardware key configured to transmit a unique message when the hardware key is pressed and released. A BIOS may refer to built-in software suitable for determining which of a computer functions may be performed without accessing programs from a disk. On PCs, the BIOS may contain all the code required to control the keyboard, display screen, disk drives, serial communications, and a number of miscellaneous functions. Information on the BIOS is typically stored on a ROM chip separate from the hard drive to protect the information from potential crashes. BIOS may track the state of the keyboard button, and relieves the burden of this at the application layer, which is far removed from the hardware.

From within an operating program, such as a Windows® operating program, use of a registerhotkey API may be utilized. Registerhotkey API may be initiated by the following sequence:
//register the hotkeys from the TH BIOS so we know when the scan button is used
RegisterHotKey(this->m_hWnd, 100, 0, Ox7d); //button going down
RegisterHotKey(this->m_hWnd, 200, 0, Ox7e); //button going up Program may further comprise a message handler configured to process the hotkey messages.
For instance, message handler may be:
LRESULT CMFCScanAquisitionDlg::OnHotKey (WPARAM wParam, LPARAM 1 Param)
switch (wParam)
case 100: ScannerOn( ) break;
case 200: ScannerOff( ) break;
return 0;
Hardware events may be processed efficiently, and an operator may be provided with increased certainty regarding the hardware state by receiving state information from the BIOS. System may allow for as many hotkeys and custom messages registered as may be desired.

Figure 21:
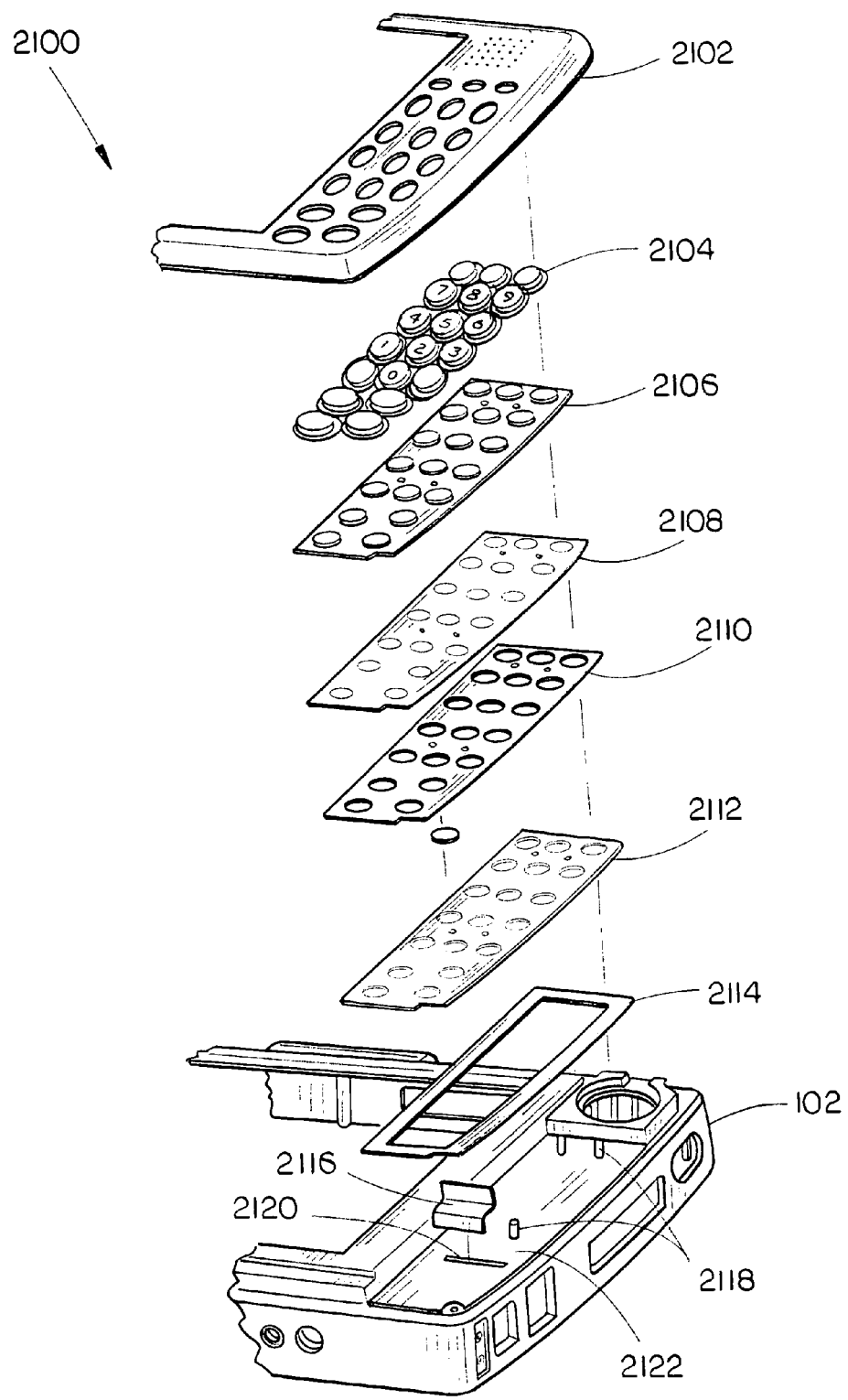
FIG. 21 is an illustration of an integrated keypad assembly implemented with a mobile information handling device in accordance with exemplary embodiments of the present invention.

Referring to FIG. 21, an illustration of a keypad assembly 2100 implemented with a mobile information handling device 102 in accordance with exemplary embodiments of the present invention is shown. Keypad assembly 2100 may be an integrated keypad assembly comprising a plurality of components 2102-2122 configured to provide keyboard integration with the mobile information handling device 102. Keypad assembly 2100 may comprise a cover assembly 2102 configured to provide protection for at least one internal layer of the keypad assembly 2100. Cover assembly 2102 may be an antenna cover. Keypad assembly may also comprise a key top layer 2104 comprised of a plurality of key tops, an elastomer key top layer receiving pad 2106, a keypad overlay layer 2108, a keypad spacer layer 2110, a keypad printed circuit board layer 2112, and a sealing layer 2114. Sealing layer 2114 may be composed of an adhesive material and may provide sealing and attachment of the printed circuit board layer 2112 within the keypad assembly 2100. Keypad assembly may also comprise a plurality of alignment posts 2118 disposed on a front panel assembly 2122, a flexible circuit assembly 2116 and a slot 2120 configured to receive the flexible circuit assembly 2116. The key top layer 2104 of the integrated keypad assembly 2100 may be composed of a rigid plastic material thermoformed to provide one-piece handling of the keypad assembly 2100 during construction and installation of the keypad onto the mobile information handling device 102. In a preferred embodiment, the key top layer comprises a plurality of individual keys painted to correspond to a numeric keypad and a function keypad. However, keys may be configured to represent any letters, numerals or functions as desired by a user or manufacturer. The key top layer receiving pad 2106 may comprise a plurality of raised regions configured to correspond to and receive the openings the key top layer 2104. The key top layer receiving pad 2106 may be composed of a material flexible enough to allow each key top to move independently of adjacent key tops. The key top layer receiving pad 2106 may also be rubberized and may be translucent. A combination of opaque and clear areas, formed via painting of the key top layer receiving pad 2106 may permit a legend and a perimeter of the keys to be visible via LED backlighting. The degree of translucency of the flexible material portion of the keypad assembly 2100 enables a selection of LED assemblies to evenly light the entire keypad assembly 2100.

It is further contemplated that the keypad assembly 2100 may be a sub-assembly of the mobile information handling device 102 and may be assembled as a module and adhered to an exterior of the sealed portion of the mobile information handling device 102 enclosure. The keypad assembly 2100 may be covered with a plastic bezel or other such changeable covering.

Figure 22:
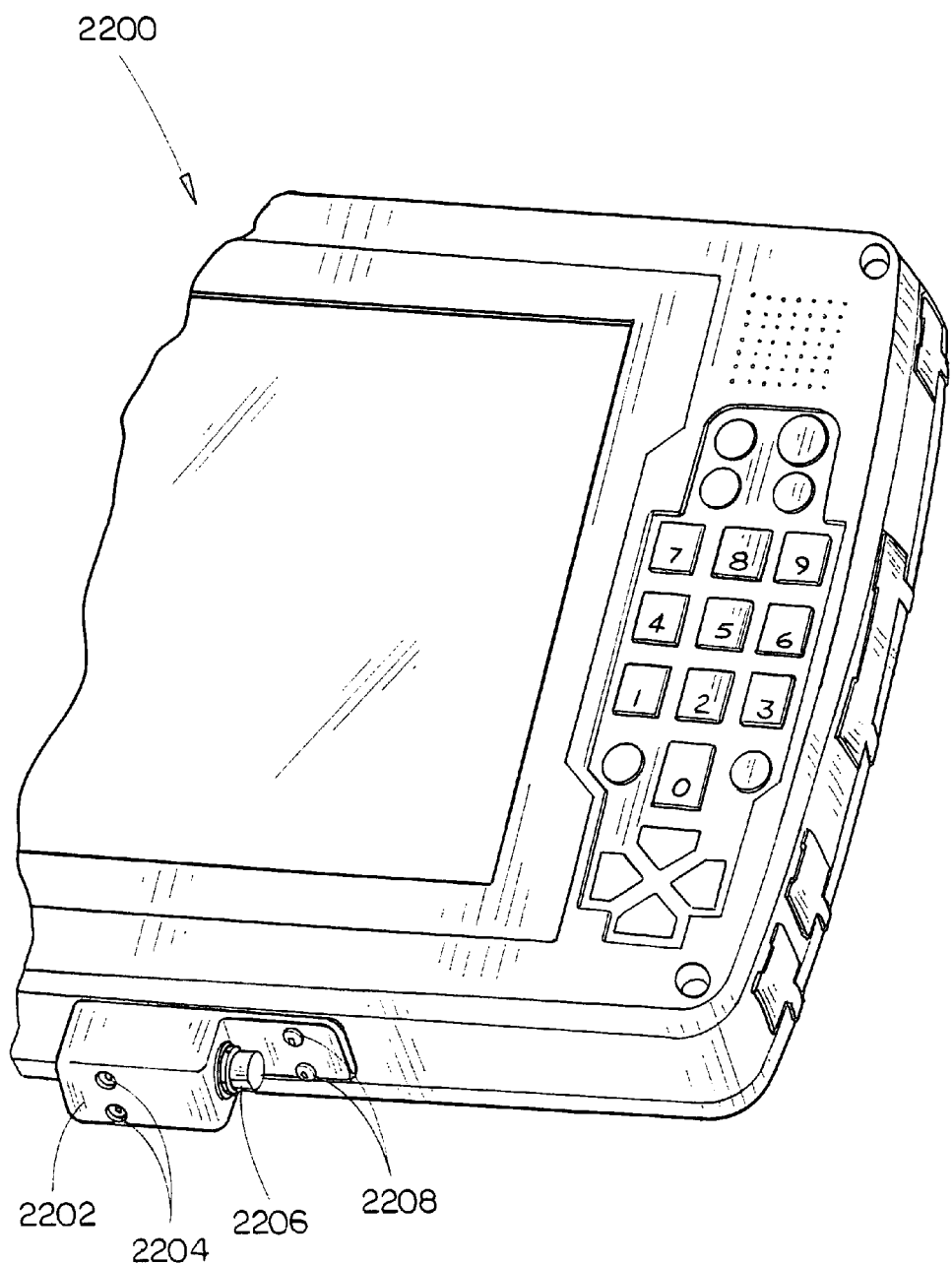
FIG. 22 is an illustration of an external power supply implemented with a mobile information handling device in accordance with exemplary embodiments of the present invention.
Figure 23A:
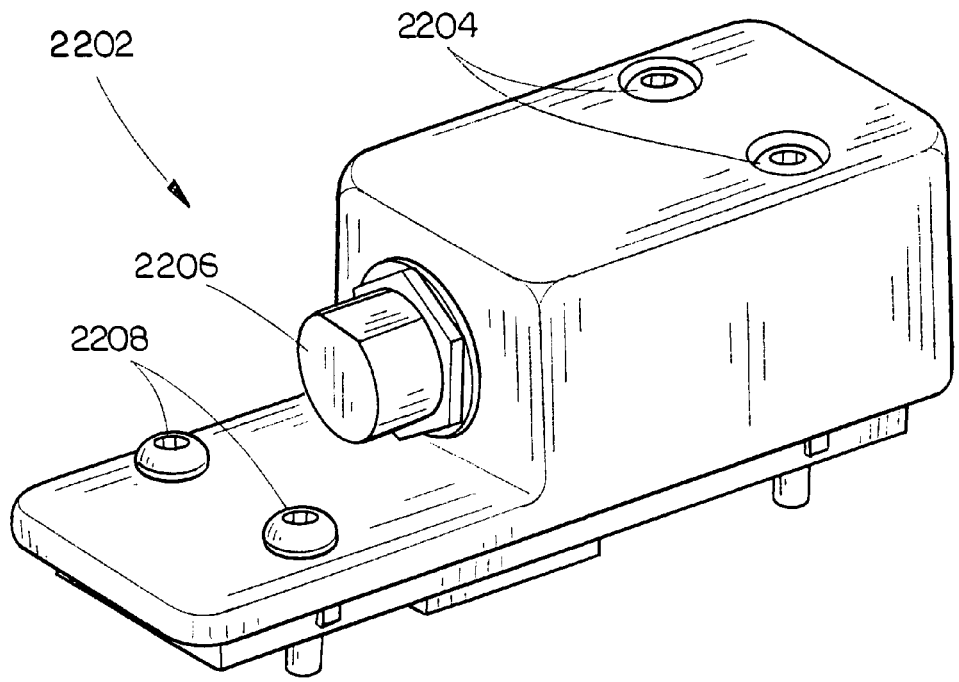
FIG. 23A is a front isometric illustration of an external power supply implemented with a mobile information handling device in accordance with exemplary embodiments of the present invention.
Figure 23B:
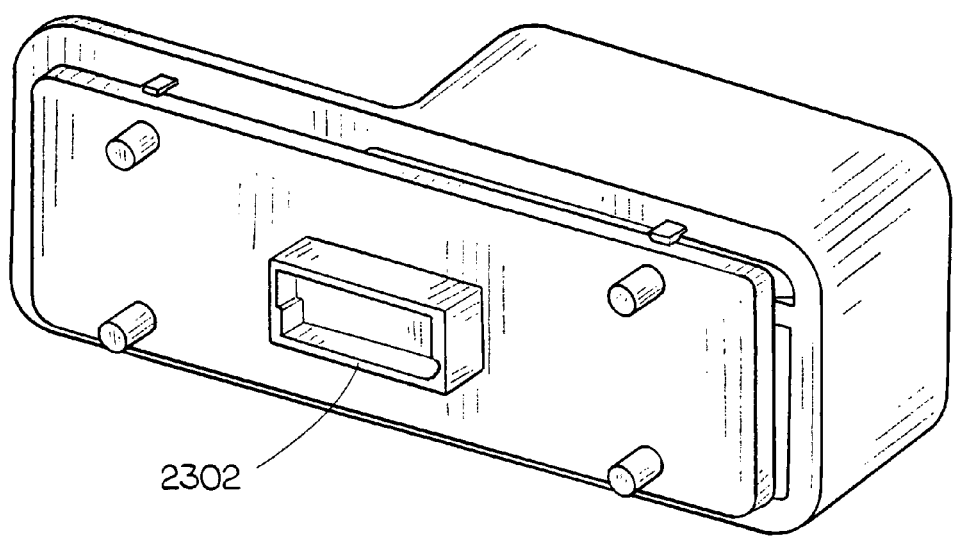
FIG. 23B is a back isometric illustration of an external power supply implemented with a mobile information handling device in accordance with exemplary embodiments of the present invention.
Figure 23C:
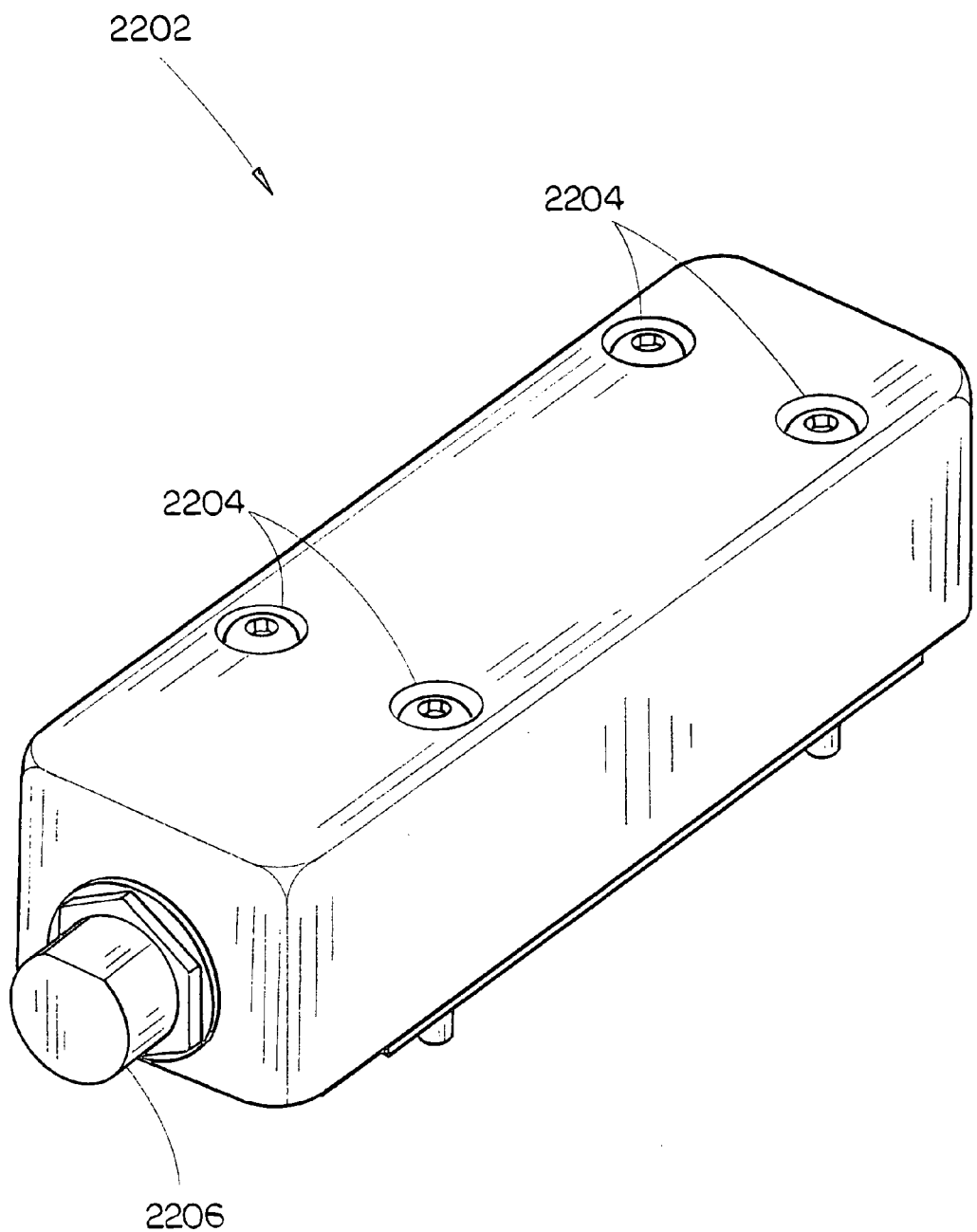
FIG. 23C is an isometric illustration an additional embodiment of an external power supply implemented with a mobile information handling device in accordance with exemplary embodiments of the present invention.

Referring to FIGS. 22-23C, illustrations of a mobile information handling device 102 implemented with an external power supply connection assembly 2202 are shown. FIG. 22 is an illustration 2200 of an external power supply connection assembly 2202 implemented with a mobile information handling device 102 in accordance with exemplary embodiments of the present invention. FIG. 23A is a front isometric illustration of an external power supply connection assembly 2202 implemented with a mobile information handling device in accordance with exemplary embodiments of the present invention. FIG. 23B is a back isometric illustration of an external power supply connection assembly 2202 implemented with a mobile information handling device in accordance with exemplary embodiments of the present invention. FIG. 23C is an isometric illustration an additional embodiment of an external power supply connection assembly 2202 implemented with a mobile information handling device in accordance with exemplary embodiments of the present invention. External power supply connection assembly 2202 may comprise a protective housing, an external electronic connection device 2206, a mobile information handling device connector 2302 and a plurality of securing assemblies 2204, 2206 configured to align with apertures disposed on the mobile information handling device 102 and further comprising an aperture and a securing device such as a screw, pin, nail bolt or the like may be inserted. External power supply connection assembly 2202 may be electronically connected to the mobile information handling device 102 via a connector 2302 disposed on a region of the external power supply. External electronic connection device 2206 may comprise an aperture suitable for receiving a jack or other such connecting device connecting the external power supply (not shown) connection assembly 2202 and the external power supply via a cable (not shown). Connection via the aperture provides a disconnect between the external power supply connection assembly 2202 and the external power supply in the event the devices become farther apart than the length of the external power supply cable allows. External electronic connection device 2206 may also be threaded to provide secure coupling of the connection device and a cable of an external power supply if the cable comprises a mating assembly configured to secure substantially over the threaded external electronic connection device 2206. External power supply may be a battery such as a lithium ion batter pack, or any other device configured to supply DC power needed to operate the mobile information handling device 102 located externally with respect to the mobile information handling device 102. An external power supply may be housed in a fully enclosed case and comprise an input power plug configured to connect to an AC wall socket (providing, for example 110-120 Vac) and an output cable configured to plug into the mobile information handling device 102 to deliver the DC power. External power supply may be worn by a user such as on the waist, over one or more shoulder or the like via an external power supply case (not shown).

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that aspects of the present invention may be conveniently implemented in forms of a software package. Such a software package may be a computer program product which employs a computer-readable storage medium including stored computer code which is utilized to program a computer to perform the disclosed function and process of the present invention. The computer-readable medium may include, but is not limited to, any type of conventional floppy disk, optical disk, CD-ROM, magneto-optical disk, ROM, RAM, EPROM, EEPROM, magnetic or optical card, or any other suitable media for storing electronic instructions.

It is believed that the various embodiments of the apparatus and system of the present invention and many of their attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof.

What is claimed:

1. A mobile information handling assembly comprising:
   a mobile information handling device further comprising a plurality of peripheral device connection ports and a plurality of card slots;
   a data processing device electronically coupled to said mobile information handling device;
   a communications interface for providing communication between the mobile information handling device and the data processing device; and
   a carrying assembly, comprising:
      a strap; and
      at least two anchor assemblies further comprising an attachment device receiving assembly configured to receive an attachment device,
   wherein the at least two anchor assemblies are configured to attach to the mobile information handling device at the at least two corners of the mobile information handling device.

2. The mobile information handling assembly of claim 1, further comprising a data processing device configured to attach to the mobile information handling device and provide attachment of a carrying assembly.

3. The mobile information handling assembly of claim 1, further comprising a plurality of protective housings, each configured to attach to the mobile information handling device a provide protection to a card inserted into one of the plurality of card slots of the mobile information handling device.

4. The mobile information handling assembly of claim 3, wherein each of the plurality of protective housings comprise a plurality of apertures configured to receive a fastening device and an extended ledge region configured to rest against a side of the mobile information handling device.

5. The mobile information handling assembly of claim 1, further comprising a universal serial bus (USB) port protective assembly configured to attach to the mobile information handling device comprising comprise a durable housing, at least one USB connective device and at least one USB port.

6. The mobile information handling assembly of claim 1, further comprising a hand strap assembly coupled to a back region of the mobile information handling device.

7. The mobile information handling assembly of claim 1, wherein the data processing device comprises an image detecting region and a plurality of apertures configured to align with one or more apertures on the mobile information handling device and through which at least one securing device may be inserted.

8. The mobile information handling assembly of claim 1, further comprising a computer executable program configured to map at least one hardware key to the data processing device.

9. The mobile information handling assembly of claim 1, wherein the mobile information handling device comprises a keypad assembly further comprising a key top layer comprised of a plurality of key tops, an elastomer key top layer receiving pad, a keypad overlay layer, a keypad spacer layer, a keypad printed circuit board layer, a sealing layer composed of an adhesive material providing sealing and attachment of the keypad printed circuit board layer within the keypad assembly, a plurality of alignment posts disposed on a front panel assembly, a flexible circuit assembly and a slot configured to receive the flexible circuit assembly.

10. The mobile information handling assembly of claim 1, further comprising a molded mounting assembly configured to receive a mobile information handling device.

11. The mobile information handling assembly of claim 1, further comprising an external power supply connection assembly.

12. A mobile information handling assembly comprising:
   a mobile information handling device further comprising a plurality of peripheral device connection ports and a plurality of card slots; and
   a carrying case configured to provide upright positioning of the mobile information handling device, wherein the carrying case comprises a stand assembly configured to pull away from a body of the carrying case to provide the upright positioning of the mobile information handling device.

13. The mobile information handling assembly of claim 12, wherein the carrying case unfolds to provide removal of the mobile information handling device or upright position of the mobile information handling device.

14. The mobile information handling assembly of claim 12, wherein the carrying case further comprises a keyboard securing assembly comprising an upper ledge and a lower ledge configured to secure a keyboard assembly.

15. The mobile information handling assembly of claim 14, wherein the keyboard securing assembly is configured to provide insertion of a keyboard assembly substantially within the area defined by the upper ledge and the lower ledge.

16. The mobile information handling assembly of claim 12, wherein the carrying case comprises a plurality of apertures configured to provide access to regions of the mobile information handling device disposed within the carrying case.

17. The mobile information handling assembly of claim 12, wherein the stand assembly comprises one or more stop assemblies configured to prevent the stand assembly from sliding beyond a distance away from the carrying case determined by the length of the stop assembly and providing a stop for the stand assembly.

18. The mobile information handling assembly of claim 17, wherein the stop assembly length is adjustable.

19. A mobile information handling kit comprising:
a mobile information handling device further comprising a plurality of peripheral device connection ports and a plurality of card slots;
a data processing device electronically coupled to said mobile information handling device;
a carrying assembly;
a carrying case configured to receive and provide an upright positioning of the mobile information handling device;
a plurality of protective housings;
at least one universal serial bus (USB) port protective assembly; and
a hand strap assembly coupled to a back region of the mobile information handling device.

* * * * *